(12) United States Patent
Bernier et al.

(10) Patent No.: US 10,132,994 B2
(45) Date of Patent: Nov. 20, 2018

(54) WRITING OF HIGH MECHANICAL STRENGTH FIBER BRAGG GRATINGS THROUGH THE POLYMER COATING OF AN OPTICAL FIBER

(71) Applicant: UNIVERSITÉ LAVAL, Québec, Québec (CA)

(72) Inventors: Martin Bernier, Québec (CA); Réal Vallée, Québec (CA); François Trépanier, Québec (CA); Julien Carrier, Québec (CA)

(73) Assignee: Universite Laval, Quebec (CA)

( * ) Notice: Subject to any disclaimer, the term of this patent is extended or adjusted under 35 U.S.C. 154(b) by 67 days.

(21) Appl. No.: 15/301,482

(22) PCT Filed: Apr. 2, 2015

(86) PCT No.: PCT/CA2015/050271
§ 371 (c)(1),
(2) Date: Oct. 3, 2016

(87) PCT Pub. No.: WO2015/154177
PCT Pub. Date: Oct. 15, 2015

(65) Prior Publication Data
US 2017/0031090 A1   Feb. 2, 2017

Related U.S. Application Data

(60) Provisional application No. 61/974,673, filed on Apr. 3, 2014.

(51) Int. Cl.
*G02B 6/02* (2006.01)
*G02B 26/08* (2006.01)
*G02B 5/18* (2006.01)

(52) U.S. Cl.
CPC ..... *G02B 6/02138* (2013.01); *G02B 6/02123* (2013.01); *G02B 26/0875* (2013.01);
(Continued)

(58) Field of Classification Search
CPC ............ G02B 6/02138; G02B 6/02395; G02B 26/0875; G02B 6/02123; G02B 6/02033; G02B 5/1857
See application file for complete search history.

(56) References Cited

U.S. PATENT DOCUMENTS 5,620,495 A   4/1997   Aspell et al.
5,745,615 A   4/1998   Atkins et al.
(Continued)

FOREIGN PATENT DOCUMENTS

CA   2 461 368   9/2004
CA   2 768 718   2/2011

OTHER PUBLICATIONS

K. O. Hill, Y. Fujii, D. C. Johnson, and B. S. Kawasaki, "Photosensitivity in optical fiber waveguides: Application to reflection filter fabrication", Appl. Phys. Lett., vol. 32, pp. 647 (1978).
(Continued)

*Primary Examiner* — Akm Enayet Ullah
(74) *Attorney, Agent, or Firm* — Occhiuti & Rohlicek LLP

(57) ABSTRACT

Methods and systems for writing a Bragg grating along a grating region of an optical fiber through a polymer coating of the optical fiber are provided. A light beam of ultrafast optical pulses is impinged on the grating region, the ultrafast optical pulses being characterized by writing wavelength at the grating region to which the polymer coating is substantially transparent The light beam is diffracted through a phase mask so as to form an interference pattern defining the Bragg grating at the grating region of the optical fiber. The
(Continued)

light beam is also focussed such that the intensity of the optical pulses is below a damage threshold within the polymer coating, and above an FBG inscription threshold within the grating region of the fiber. Optical fiber having Bragg gratings and improved mechanical are also provided.

18 Claims, 13 Drawing Sheets

(52) U.S. Cl.
CPC ........ *G02B 5/1857* (2013.01); *G02B 6/02033* (2013.01); *G02B 6/02395* (2013.01); *G02B 2006/02161* (2013.01)

(56) References Cited

U.S. PATENT DOCUMENTS

| 5,881,186 | A | 3/1999 | Starodubov | |
|---|---|---|---|---|
| 6,654,521 | B2* | 11/2003 | Sheng | G02B 6/02085 385/37 |
| 6,993,221 | B2 | 1/2006 | Mihailov et al. | |
| 7,031,571 | B2* | 4/2006 | Mihailov | G02B 5/1857 359/563 |
| 2013/0066228 | A1* | 3/2013 | Capcelea | A61B 5/0084 600/559 |

OTHER PUBLICATIONS

M. J. Matthewson, C. R. Kurkjian, and J. R. Hamblin, "Acid stripping of fused silica optical fibers without strength degradation," J. Lightwave Technol. 15, 490-497 (1997).
P. J. Lemaire, R. M. Atkins, V. Mizrahi, K. L. Walker, K. S. Kranz, and W. A. Reed, "High pressure H2 loading as a technique for achieving ultrahigh UV photosensitivity and thermal sensitivity in GeO2 doped optical fibers," Electron. Lett. 29, 1191-1193 (1993).
D. Varelas, D. M. Costantini, H. G. Limberger, and R. P. Salathé, "Fabrication of high-mechanical-resistance Bragg gratings in single-mode optical fibers with continuous-wave ultraviolet laser side exposure," Opt. Lett. 23, 397-399 (1998).
T. Erdogan, V. Mizrahi, P. J. Lemaire, and D. Monroe, "Decay of ultraviolet-induced fiber Bragg gratings," J. Appl. Phys. 76, 73-80 (1994).
L. Chao, L. Reekie, and M. Ibsen, "Grating writing through fiber coating at 244 and 248nm," Electron. Lett. 35, 924-926 (1999).
R. P. Espindola, R. M. Atkins, N. P. Wang, D. A. Simoff, M. A. Paczkowski, R. S. Windeler, D. L. Brownlow, D. S. Shenk, P. A. Glodis, T. A. Strasser, J. J. DeMarco and P. J. Chandonnet, "Highly reflective fiber Bragg gratings written through a vinyl ether coating," IEEE Photon. Tech. Lett. 11, 833-835 (1999).
D. S. Starodubov, V. Grubsky, and J. Feinberg, "Efficient Bragg grating fabrication in a fiber through its polymer jacket using near-UV light," Electron. Lett. 33(15), 1331-1333 (1997).
S. J. Mihailov, C. W. Smelser, D. Grobnic, R. B. Walker, P. Lu, H. Ding, and J. Unruh, "Bragg Gratings Written in All-SiO2 and Ge-Doped Core Fibers With 800-nm Femtosecond Radiation and a Phase Mask," J. Lightwave Technol. 22, 94-100 (2004).
A. Martinez, M. Dubov, I. Khrushchev, and I. Bennion, "Direct writing of fibre Bragg gratings by femtosecond laser," Electron. Lett. 40, 1170-1172 (2004).
S. J. Mihailov, D. Grobnic, C. W. Smelser, P. Lu, R. B. Walker, and H. Ding, "Bragg grating inscription in various optical fibers with femtosecond infrared lasers and a phase mask," Opt. Mater. Express 1(4), 754-765 (2011).
M. Bernier, D. Faucher, R. Vallée, A. Saliminia, G. Androz, Y. Sheng, and S. L. Chin, "Bragg gratings photoinduced in ZBLAN fibers by femtosecond pulses at 800 nm," Opt. Lett. 32(5), 454-456 (2007).
M. Bernier, M. El-Amraoui, J. F. Couillard, Y. Messaddeq, and R. Vallée, "Writing of Bragg gratings through the polymer jacket of low-loss As2S3 fibers using femtosecond pulses at 800 nm," Opt. Lett.37(18), 3900-3902 (2012).
S. J. Mihailov, D. Grobnic, C. W. Smelser, "Efficient grating writing through fibre coating with femtosecond IR radiation and phase mask, " Electron. Lett. 43 (8), pp. 442-443, (2007).
A. Martinez, I. Y. Khrushchev, I. Bennion, "Direct inscription of Bragg gratings in coated fibers by an infrared femtosecond laser," Opt. Lett. 31 (11), 1603-1605, (2006).
A. Martinez, Y. M. E. Shazly, S. N. Kukureka, K. Sudgen, I.Y. Khrushchev, I. Bennion, "Mechanical Reliability of Fibre Bragg Gratings Inscribed Through the Coating by a Femtosecond Laser," European Conf. on Optical Communications, Cannes, France, Paper We3.P.13 (2006).
D. Grobnic, S. J. Mihailov, C. W. Smelser, and R. T. Ramos, "Ultrafast IR laser writing of strong Bragg gratings through the coating of high Ge-doped optical fibers," IEEE Photon. Tech. Lett., 20 (12), 973-975, (2008).
S. J. Mihailov, D. Grobnic, R. B. Walker, C. W. Smelser, G. Cuglietta, T. Graver, A. Mendez, "Bragg grating writing through the polyimide coating of high NA optical fibres with femtosecond IR radiation," Opt. Commun. 281 (21), 5344-5348, (2008).
C. W. Smelser, F. Bilodeau, B. Malo, D. Grobnic, and S. J. Mihailov, "Novel Phase Mask Apparatus for "through the Jacket" Inscription of FBG's in Unloaded SMF-28 Fiber," in Advanced Photonics & Renewable Energy, OSA Technical Digest (CD) (Optical Society of America, 2010), paper BThD3.
S. J. Mihailov, "Fiber Bragg grating sensors for harsh environments," Sensors 12, 1898-1918 (2012).
M. Bernier, S. Gagnon, and R. Vallée, "Role of the 1D optical filamentation process in the writing of first order fiber Bragg gratings with femtosecond pulses at 800nm," Opt. Mater. Express 1, 832-844 (2011).
C. W. Smelser, D. Grobnic, and S. J. Mihailov, "Generation of pure two-beam interference grating structures in an optical fiber with a femtosecond infrared source and a phase mask," Opt. Lett. 29, 1730-1732 (2004).
A. Rosenthal and M. Horowitz, "Inverse scattering algorithm for reconstructing strongly reflecting fiber Bragg gratings," IEEE J. Quantum Electron. 39, 1018-1026 (2003).

* cited by examiner

WRITING OF HIGH MECHANICAL STRENGTH FIBER BRAGG GRATINGS THROUGH THE POLYMER COATING OF AN OPTICAL FIBER

CROSS REFERENCE TO RELATED APPLICATION

This application is the national phase under 35 USC 371 of international application no. PCT/CA2015/050271, filed Apr. 2, 2015, which claims the benefit of the priority date of U.S. Provisional Application No. 61/974,673 filed Apr. 3, 2014. The contents of the aforementioned applications are incorporated herein in their entirety.

TECHNOLOGICAL FIELD

The present invention relates to the field of Fiber Bragg Gratings and more particularly concerns a method for writing such gratings which avoids degrading the mechanical strength of the optical fiber.

BACKGROUND

Since the demonstration at the end of the 1970's by Hill et al. of the possibility of writing permanent reflection gratings in the core of optical fibers (named "FBGs" for Fiber Bragg Gratings), intensive development has been carried out on this technology driven by the development of high-end optical fiber applications in numerous fields such as telecommunications, sensing and lasers. Conventionally, FBGs are written by side imprinting a UV interference pattern along a germanium-doped silica fiber that is photosensitive when exposed in the 240-260 nm band. This FBG writing technique was well developed in the 1990's to the point of making high performance gratings written in standard silica fibers (i.e. SMF28) commercially available. The typical process to achieve such gratings combines the steps of chemically stripping the UV opaque polymer coating from the optical fiber, hydrogen loading of the fiber to increase its photosensitivity, writing the FBG using low intensity CW (continuous wave) light to avoid UV-induced weakness of the fiber observed in pulsed regime, thermally aging the FBG to outgas the hydrogen and stabilize its index modulation for long-term operation and finally, recoating the bare fiber with polymer. All of these steps must be performed with great care for the process to be reliable, which ultimately limits the productivity of the FBG fabrication process.

Writing through the coating (WTC) of the fiber is an attractive idea since the stripping/recoat process is particularly complex and time-consuming. Attempts to WTC with UV light were made by using special UV transparent coatings (see L. Chao, L. Reekie, and M. Ibsen, "Grating writing through fiber coating at 244 and 248 nm," Electron. Lett. 35, 924-926 (1999); and R. P. Espindola, R. M. Atkins, N. P. Wang, D. A. Simoff, M. A. Paczkowski, R. S. Windeler, D. L. Brownlow, D. S. Shenk, P. A. Glodis, T. A. Strasser, J. J. DeMarco and P. J. Chandonnet, "Highly reflective fiber Bragg gratings written through a vinyl ether coating," IEEE Photon. Tech. Lett. 11, 833-835 (1999)) and by using near UV light where standard polymer coatings are partially transparent (D. S. Starodubov, V. Grubsky, and J. Feinberg, "Efficient Bragg grating fabrication in a fiber through its polymer jacket using near-UV light," Electron. Lett. 33(15), 1331-1333 (1997)). However, it was not possible to induce a significant refractive index modulation using such techniques in standard silica fibers, thereby limiting this approach to specialty silica fibers with an enhanced photosensitivity and/or a special coating.

At the beginning of the 2000's, a new approach to photosensitivity based on a non-resonant process using the multiphoton absorption of ultrashort infrared pulses demonstrated the possibility of writing FBGs in silica fibers without the need for sensitization, with both the phase-mask (PM) (S. J. Mihailov, C. W. Smelser, D. Grobnic, R. B. Walker, P. Lu, H. Ding, and J. Unruh, "Bragg Gratings Written in All-SiO2 and Ge-Doped Core Fibers With 800-nm Femtosecond Radiation and a Phase Mask," J. Lightwave Technol. 22, 94-100 (2004)) and the point-by-point (PbP) techniques (A. Martinez, M. Dubov, I. Khrushchev, and I. Bennion, "Direct writing of fibre Bragg gratings by femtosecond laser," Electron. Lett. 40, 1170-1172 (2004)). The PM technique was particularly well developed and proved its usefulness in writing FBGs in different non-silica materials (S. J. Mihailov, D. Grobnic, C. W. Smelser, P. Lu, R. B. Walker, and H. Ding, "Bragg grating inscription in various optical fibers with femtosecond infrared lasers and a phase mask," Opt. Mater. Express 1(4), 754-765 (2011)), notably those suitable for mid-infrared applications such as fluorides (M. Bernier, D. Faucher, R. Vallée, A. Saliminia, G. Androz, Y. Sheng, and S. L. Chin, "Bragg gratings photoinduced in ZBLAN fibers by femtosecond pulses at 800 nm," Opt. Lett. 32(5), 454-456 (2007)) and chalcogenides (M. Bernier, M. El-Amraoui, J. F. Couillard, Y. Messaddeq, and R. Vallée, "Writing of Bragg gratings through the polymer jacket of low-loss As2S3 fibers using femtosecond pulses at 800 nm," Opt. Lett. 37(18), 3900-3902 (2012)). WTC in silica fibers was successfully demonstrated using 800 nm femtosecond pulses and both the PM (S. J. Mihailov, D. Grobnic, C. W. Smelser, "Efficient grating writing through fibre coating with femtosecond IR radiation and phase mask" Electron. Lett. 43 (8), pp. 442-443, (2007)) and PbP techniques (A. Martinez, I. Y. Khrushchev, I. Bennion, "Direct inscription of Bragg gratings in coated fibers by an infrared femtosecond laser," Opt. Lett. 31 (11), 1603-1605, (2006)).

Since the PbP technique relies on the formation of void-like defects, the resulting FBGs were reported to present poor mechanical resistance with a mean breaking stress of about 15-20% of the pristine fiber. The PM technique was more successful at this task and demonstrated the possibility of fabricating fundamental order FBGs through both the acrylate and polyimide coating of photosensitive fibers with a mean strain at breakage of respectively 75-85% and 50% of the pristine fiber. (see D. Grobnic, S. J. Mihailov, C. W. Smelser, and R. T. Ramos, IEEE Photon. Tech. Lett., 20, 973, (2008); and 19. S. J. Mihailov, D. Grobnic, R. B. Walker, C. W. Smelser, G. Cuglietta, T. Graver, A. Mendez, Opt. Commun. 281, 5344, (2008)). In both cases, optical damage of the coating was observed and correlated with a saturation of the FBG reflectivity growth.

To date, there has only been one demonstration of WTC of FBGs in unloaded SMF28 fibers by using the PM technique. Referring to C. W. Smelser, F. Bilodeau, B. Malo, D. Grobnic, and S. J. Mihailov, in Advanced Photonics & Renewable Energy, OSA Technical Digest (CD) (Optical Society of America, 2010), paper BThD3, a third order FBG with 90% reflectivity was reported by using a special apparatus combining two short focal length lenses on each part of a third order phase-mask. The mechanical strength of the resulting FBGs was not reported but a structure in the polymer coating was observed, which suggests a degradation of the mechanical properties of the fiber. Since broadband fs-pulses highly disperse angularly after their interaction with a short period phase-mask, the reported approach of using a lens after the phase-mask cannot unfortunately be applied to the writing of fundamental order FBGs, which requires the fiber to be in close proximity to the phase-mask.

In view of the above, there remains a need for a technique of writing high mechanical strength FBGs which alleviates at least some of the drawbacks above.

SUMMARY

In accordance with one aspect, there is provided a method for writing a Bragg grating along a grating region of an optical fiber through a polymer coating of the optical fiber.

The method includes impinging a light beam of ultrafast optical pulses on the grating region of the optical fiber through the polymer coating. The ultrafast optical pulses are characterised by writing wavelength at the grating region to which the polymer coating is substantially transparent. The method also includes diffracting the light beam through a phase mask so as to form an interference pattern defining the Bragg grating at the grating region of the optical fiber. The method further includes focussing the light beam such that an intensity of the optical pulses is below a damage threshold within the polymer coating, and above an FBG inscription threshold within the grating region of the fiber.

In accordance with another aspect, there is also provided an optical system for writing a Bragg grating along a grating region of an optical fiber through a polymer coating of the optical fiber. The optical system includes a light generating module generating a light beam of ultrafast optical pulses impinging on the grating region of the optical fiber through the polymer coating. A phase mask is disposed in a path of the light beam and diffracts the light beam so as to form a grating pattern at the grating region of the optical fiber. The system further includes at least one focussing component disposed in a path of the light beam upstream the phase mask and focussing the light beam such that an intensity of the optical pulses is below a damage threshold within the polymer coating, and above an FBG inscription threshold within the grating region of the fiber.

In accordance with another aspect, there is provided an optical fiber having a Bragg grating along a non-photosensitized grating region thereof, the optical fiber having a pristine polymer coating around the grating region. In one implementation the optical fiber is characterized by a mechanical resistance greater than 20% of a mechanical resistance of an identical grating-free optical fiber.

In accordance with another aspect, there is provided an optical fiber having a Bragg grating along a photosensitized grating region thereof, the optical fiber having a pristine acrylate polymer coating around the grating region, the optical fiber being characterized by a mechanical resistance greater than 85% of a mechanical resistance of an identical grating-free optical fiber.

In accordance with yet another aspect, there is provided an optical fiber comprising Bragg grating along a photosensitized grating region thereof, the optical fiber having a pristine polyimide polymer coating around the grating region, the optical fiber being characterized by a mechanical resistance greater than 50% of a mechanical resistance of an identical grating-free optical fiber.

Other features and advantages will be better understood upon a reading of embodiments thereof with reference to the appended drawings.

DETAILED DESCRIPTION

Figure 1:
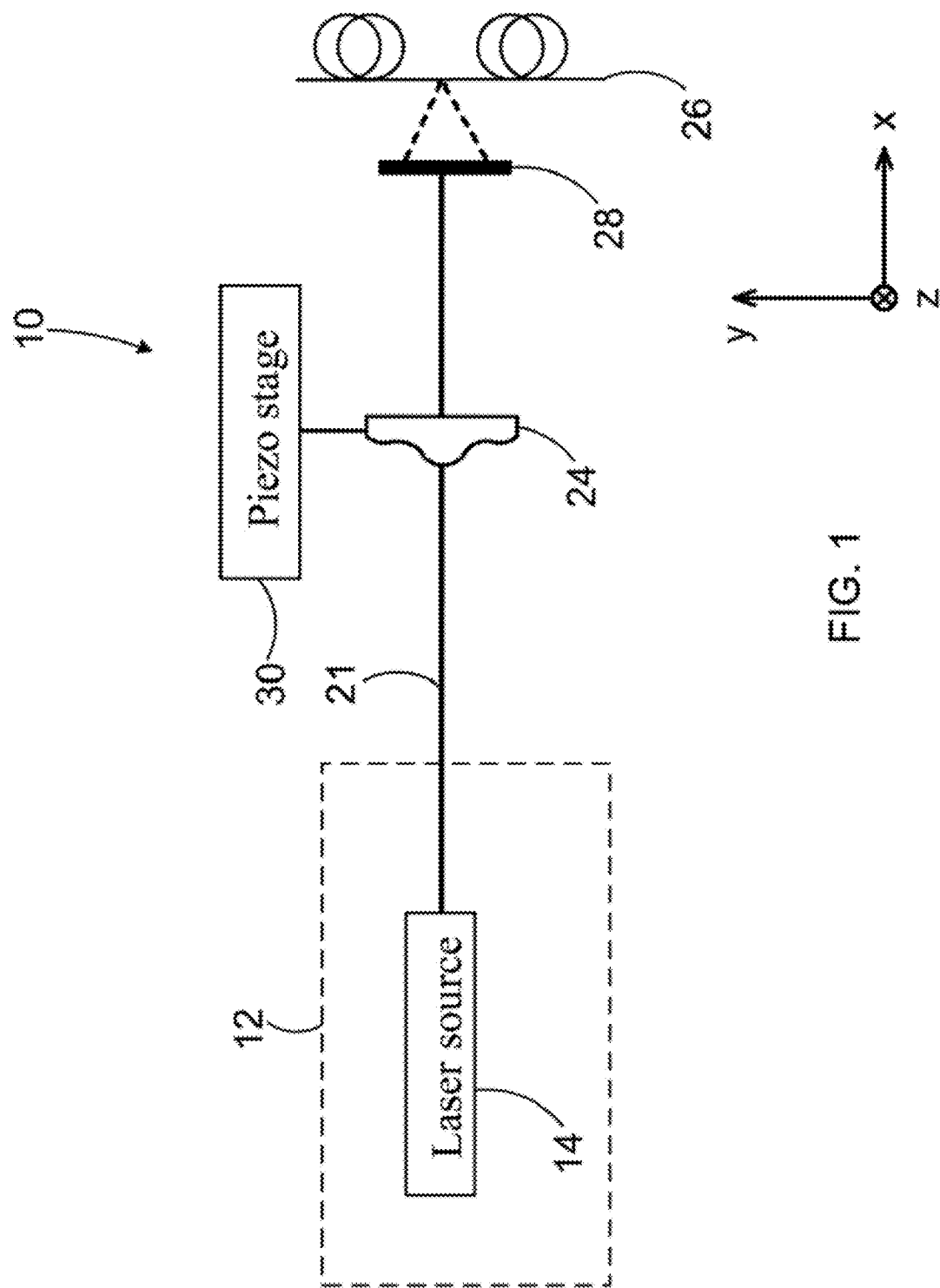
FIG. 1 is a schematic representation of an optical system for writing a Bragg grating in accordance with one embodiment.

The present description generally relates to methods and systems for writing a Bragg grating along a grating region of an optical fiber through a polymer coating of the optical fiber, and to the resulting FBGs.

Optical fibers are typically composed of a light guiding core and one or more cladding surrounding the core. A protective polymer coating surrounds the outermost cladding. It is an advantageous aspect of embodiments of the present method that it can be used with a variety of optical fiber types. The core and cladding of the optical fiber may be made of glass such as silica or any type of oxide glass, and may be made of pure glass or may be doped with one or more dopants. Advantageously, the fiber need not be made of a photosensitive material or be photosensitized prior to the writing of a Bragg grating therein. As such, co-doping the fiber with germanium, as is known in the art to enhance photosensitivity, is not required, although in some embodiments the fiber may be germanium-doped and hydrogen- or deuterium-loaded to enhanced photosensitivity without departing from the scope of the invention.

In some embodiments, the optical fiber may alternatively be made of a crystalline material such as a sapphire, germanium, zinc selenide, yttrium aluminium garnet (YAG) or other crystalline materials with similar physical properties.

In other embodiments, the optical fiber may alternatively be made of low phonon energy glass such as a fluoride, chalcogenide or chalcohalide glass or other glass materials with similar physical properties. The low phonon energy glass medium can be of a variety of compositions, such as, but not limited to, doped or undoped fluoride glasses such as ZBLA, ZBLAN, ZBLALi, chalcogenide glasses such as $As_2S_3$ or $As_2Se_3$ or chalcohalide glasses. It is to be noted that low phonon energy glasses typically have physical properties that significantly differ from those of fused silica, including but not limited to a much higher thermal expansion coefficient, a much lower glass transition temperature and a lower thermal conductivity. Appropriate strategies may be used to take such properties under consideration, such as for example explained in U.S. Pat. No. 8,078,023 (VALLÉE et al.), the entire contents of which are incorporated herein by reference.

In some embodiments, the core and/or the cladding of the optical fiber can be doped with one or more rare-earth element such as ytterbium erbium, holmium, thulium, praseodymium, neodymium, dysprosium, etc, or combinations thereof. The optical fiber may also include other dopants such as aluminum, phosphorus, etc.

The polymer coating, sometimes referred to as the fiber jacket, may be made of any suitable polymer or hybrid polymer material. For example, standard telecommunication optical fibers are typically provided with an acrylate or fluoroacrylate-based coating. In other embodiments, the polymer coating may be made of a polyimide, a silicone, a polytetrafluoroethylene (e.g. Teflon™), an organically modified ceramic (e.g. Ormocer™) and the like. In some cases, a thin layer of a hermetic material, such as carbon or metal, can be present at the polymer-to-cladding interface without departing from the scope of the invention.

Throughout the present description, the expression "Bragg grating" is understood to refer to any periodic or aperiodic refractive index pattern permanently provided in the optical fiber. It will be understood by one skilled in the art that the Bragg grating may be single or multi-channel, and may be chirped, slanted, sampled, or involve more than one such characteristics. The Bragg grating reflects light at one or more target wavelengths, that is, the wavelength or wavelengths which require filtering by the Bragg grating in its predestined application. For example, in telecommunication applications Bragg gratings may be used to filter light at a particular wavelength from a WDM (Wavelength Division Multiplexing) signal. In the context of fiber lasers, Bragg gratings can be used as one or both reflectors of the laser cavity, and the target wavelength would then correspond to the wavelength of the laser beam building in the laser cavity. In optical sensor applications, Bragg gratings can serve as temperature or strain sensing mechanisms, since such parameters affect the refractive index of the optical fiber, which in turn affects the wavelength of light being reflected or transmitted by a Bragg grating in this optical fiber. One skilled in the art will readily understand that the expression "target wavelength", even used in the singular, could refer to a more complex spectral profile reflected or transmitted by the Bragg grating.

One skilled in the art will also readily understand that Bragg gratings can be written according to embodiments of the invention using a variety of experimental set-ups or systems. Referring to FIG. 1, there is shown an example of an optical system 10 which may be used to perform the method according to embodiments of the invention.

The method according to embodiments of the invention involves impinging a light beam of ultrafast optical pulses 21 on the grating region 31 of the optical fiber 26 through the polymer coating. The system 10 may therefore include a light generating module 12, here embodied by a femtosecond laser source 14. Of course, the light generating module 12 may include additional optical components such as mirrors, lenses and the like. In one example, the femtosecond laser source 14 may be a Ti-sapphire laser emitting the light beam of optical pulses 21 at about 800 nm and of pulse duration of 35 fs. In another example, the femtosecond laser source 14 may be an ytterbium-doped fiber laser emitting the light beam of optical pulses 21 at about 1045 nm and of pulse duration of 250 fs. The ultrafast optical pulses 21 may alternatively result from the nonlinear conversion of the aforementioned laser sources through second harmonic generation or optical parametric processes.

By "ultrafast", it is understood that the duration of the optical pulses is in the femtosecond range, preferably less than 2 picoseconds, and more preferably between 10 and 1000 femtoseconds. The repetition rate of these optical pulses may for example be set between 10 Hz and 250 000 Hz. As one skilled in the art will readily understand, at low repetition rate, for example less than 10 Hz, the writing process requires a longer exposure time to reach a target reflectivity of the Bragg grating, which may lead to mechanical instabilities and therefore limit the growth of the grating. The use of a high repetition rate (i.e. above 250 kHz) enables a shorter exposure time to reach the same target reflectivity but may also lead to a local detrimental heating effect that would limit the grating growth. The repetition rate of the optical pulses is therefore preferably set to an appropriate value within the range above in order to avoid the detrimental effects of both extremes. It will however be understood that this range is given by way of information only and that different implementations may involve different repetition rates without departing from the scope of the invention.

The selection of the writing wavelength of the optical pulses, that is, their wavelength when they reach the fiber, preferably takes under consideration the optical properties of the optical fiber. It will be readily understood that the polymer coating should be substantially transparent at the writing wavelength in order to enable the WTC process. The writing wavelength should furthermore be suitable to affect the core and/or cladding of the optical fiber in order to write the grating in the grating region. It is known in the art that ultrafast light pulses in a glass material can lead to a permanent refractive index change in the material through one or more physical phenomena such as glass densification, the formation of color centers, the formation of damaged micro-structures, etc. It will be readily understood that one or more of these phenomena may be present in various embodiments of the method described herein without departing from the scope of the present invention.

Still referring to FIG. 1, the system further include a phase mask 28, disposed between the light generating module 12 and the optical fiber 26 It will be readily understood that the expression "phase mask" refers to a surface-relief structure forming corrugations in a material transmitting radiation at the writing wavelength. The corrugations define a diffraction grating having parameters selected such that the ultrafast optical pulses 21 are diffracted by the phase mask to form the interference pattern defining the Bragg grating within the grating region 31 of the fiber 26. The phase mask 28 may for example be made of silica and may be fabricated according to any appropriate technique as well known in the art.

The phase mask 28 is characterised by a pitch corresponding to the period of its corrugations. The pitch of the phase mask is selected according to the target wavelength of the FBG. To obtain a Bragg grating resonance at a design target wavelength $\lambda_B$, the periodic modulation of the effective refractive index in the grating region of the optical fiber must respect the phase-matching condition given by:

$$\frac{2 \cdot n \cdot \pi}{\Lambda} = 2 \cdot \frac{2\pi \cdot n_{eff}}{\lambda_B} \quad (1)$$

where $n_{eff}$ is the effective refractive index of the medium of the grating region, $\Lambda$ is the period of the interference pattern at the grating region and n=1, 2, 3 ... is the diffraction order. By simplification, we obtain:

$$\lambda_B = 2 \cdot n_{eff} \cdot \frac{\Lambda}{n} \quad (2)$$

The design wavelength $\lambda_B$ corresponds to the fundamental Bragg resonance for n=1. In some embodiments, the phase mask has a pitch providing the fundamental Bragg resonance as the target wavelength. Advantageously, such embodiments provide an optimal diffraction efficiency, that is, the grating coupling coefficient, (and therefore its reflectivity) is maximal for a given refractive index modulation. In other embodiments, the pitch of the phase mask may be selected to provide a high order resonance (n=2, 3, ... ) at the target wavelength of the Bragg grating.

The interference pattern obtained through diffraction of the ultrafast optical pulses by the phase mask and impinged on the grating region of the optical fiber results in a modification of the refractive index of the glass in a permanent fashion, as explained above, therefore providing the desired Bragg grating. Preferably, the optical pulses are focussed on a region around the fiber core, in order to partially or totally cover the propagating mode to be reflected. However, in some implementations the grating region of the fiber in which the Bragg grating is written can be any suitable portion of the core of the fiber, its cladding or both. As will be explained in more detail below, in some implementations the methods and systems described herein may provide for the writing of a very localized grating, which can be precisely located within the fiber.

In accordance with one aspect, the method includes a step of focussing the light beam 21 such that the intensity of the optical pulses is below a damage threshold within the polymer coating, and above an FBG inscription threshold within the grating region of the fiber.

It will be readily understood by one skilled in the art that a light beam of ultrafast pulses propagating through the polymer coating of an optical fiber is likely to affect the coating in a different manner depending on its intensity. If this intensity is kept low enough, than the integrity of the polymer coating will not be substantially compromised, and the mechanical strength of the optical fiber can remain unaffected by the WTC process. At very high light intensity values, the polymer coating can be ablated by the light beam. For intermediate values, if the intensity of the light beam in the polymer coating is equal to or above a damage threshold, than the optical pulses are likely to change and/or affect the chemical properties of the polymer material of the coating, in particular its light transmission properties. In practice, a blackening of the coating is observed, and can be directly linked to the weakening of the mechanical resistance of the fiber after the WTC process. By contrast, within the grating region itself the intensity of the light beam needs to be high enough to lead to a permanent refractive index change in the material through physical phenomena such as glass densification, the formation of color centers, the formation of damaged micro-structures, etc., as explained above. Therefore, the FBG inscription threshold corresponds to the minimum light intensity within the grating region at which the desired transformation of the refractive index takes place.

As will be readily understood by one skilled in the art, the intensity of an optical pulse is defined as its power per unit area. The level of focussing of the light beam will affect the localized intensity at any given point within the light beam, as the same amount of power is more or less concentrated within the area spanned by the light beam. Embodiments of the present method therefore involve focussing the light beam in order to control the intensity of the optical pulses to avoid or minimize damage to the polymer coating, while still writing a strong grating in the grating region of the optical fiber.

It will be readily understood that the specific intensity value of the damage threshold depends on the material embodying the polymer coating and the optical properties of the light pulses. The value of this threshold for a particular set of conditions can be measured experimentally using techniques known to those skilled in the art. For example, using 35 fs pulses at a wavelength of 800 nm, the following approximate damage thresholds have been observed:

TABLE 1

| Coating material | Damage intensity threshold (TW/cm$^2$) |
|---|---|
| Polyimide | 0.3 |
| Acrylate or fluoroacrylate | 1 |
| Teflon ™ | 2 |

It is to be noted that 1 TW corresponds to 1×10$^{12}$ W.

The FBG inscription threshold similarly depends on the material of the grating region and the optical properties of the light pulses. The value of this threshold for a particular set of conditions can also be measured experimentally using techniques known to those skilled in the art. For example, again using 35 fs pulses at a wavelength of 800 nm by way of example, the following approximate FBG inscription thresholds have been observed:

TABLE 2

| Fiber core composition | FBG inscription threshold (TW/cm$^2$) |
|---|---|
| Photosensitized (H$_2$ or D$_2$-loaded) GeO$_2$-silica | 7 |
| Unloaded GeO$_2$-silica | 20 |
| Pure silica | 25 |
| Undoped Fluoride glass (ZBLAN) | 25 |

While it is preferable that the intensity of the light beam within the polymer coating remains below the damage threshold at all points, it will be readily understood by one skilled in the art that within the grating region, only a portion of the light beam may be above the writing threshold without departing from the scope of the invention. Indeed, it suffice for a suitable fraction of the light beam to meet this condition, and therefore provide the desired index modulation in the grating region, as other portions of the light beam having an intensity below the writing threshold may simply be transmitted through the fiber without damaging or otherwise affecting its properties.

Advantageously, in some implementations, method as described herein may be used to obtain Bragg gratings of particularly high reflectivity. Indeed, as the writing process does not damage the polymer coating, the duration of this writing process is not limited by the necessity to minimize such damages. The grating region of the optical fiber can therefore be exposed to the light beam for a longer period of time, allowing a greater refractive index modulation to be achieved than with prior art methods. The present method may therefore involve exposing the grating region to the light beam for a period of time sufficient to induce a refractive index modulation any useful value, for example greater than $5 \times 10^{-5}$, which is the minimal index modulation required for the Bragg grating to be useful for typical applications.

Focussing the light beam to meet both thresholds according to implementations of the invention can be viewed as providing a ratio of the intensity of the light beam between the writing region and the polymer coating above a WTC limit. The WTC limit may therefore be defined as the minimum ratio between the intensity of the light beam in the grating region of the optical fiber to its intensity in the polymer coating that allows the inscription of the grating through the coating while avoiding damages to this coating.

One skilled in the art will readily understand that the value of the WTC limit will depend on the materials forming the core, cladding and polymer coating of the fiber. Examples of observed minimum WTC ratios for different types of fiber are provided in Table 3:

TABLE 3

| Optical fiber type | WTC limit (minimum intensity ratio) |
| --- | --- |
| Polyimide-coated pure silica fiber | 80 |
| Polyimide-coated unloaded GeO$_2$-silica fiber | 66 |
| Acrylate-coated pure silica fiber | 25 |
| Polyimide-coated photosensitized GeO$_2$-silica fiber | 23 |
| Acrylate-coated unloaded GeO$_2$-silica fiber | 20 |
| Acrylate-coated photosensitized GeO$_2$-silica fiber | 7 |

In some implementations, the focussing of the light beam of optical pulses according to one of the conditions above is provided by a suitable focusing geometry of the optical system used to write the grating, including at least one focussing component disposed in a path of the light beam upstream the phase mask. Referring for example back to FIG. 1, the focussing geometry may be defined by the configuration of the light generating module 12, phase mask 28, optical fiber 26 and any other optical element acting on the optical pulses 21.

In typical implementations, the at least one focussing component may include a cylindrical-type lens. A lens is typically understood to be a glass or plastic optical device which transmits and refracts light, and can be used to focus this light on a focussing location. A spherical lens has a spherical curvature along both axes transversal to the light propagation therethrough, also referred to as the lens axis. Light is therefore focussed at the focal point of the lens. By contrast, a cylindrical lens typically has one surface transversal to the lens axis which has a spherical curvature along one axis, and no curvature along its other axis. Light is therefore focussed along a line.

Figure 2:
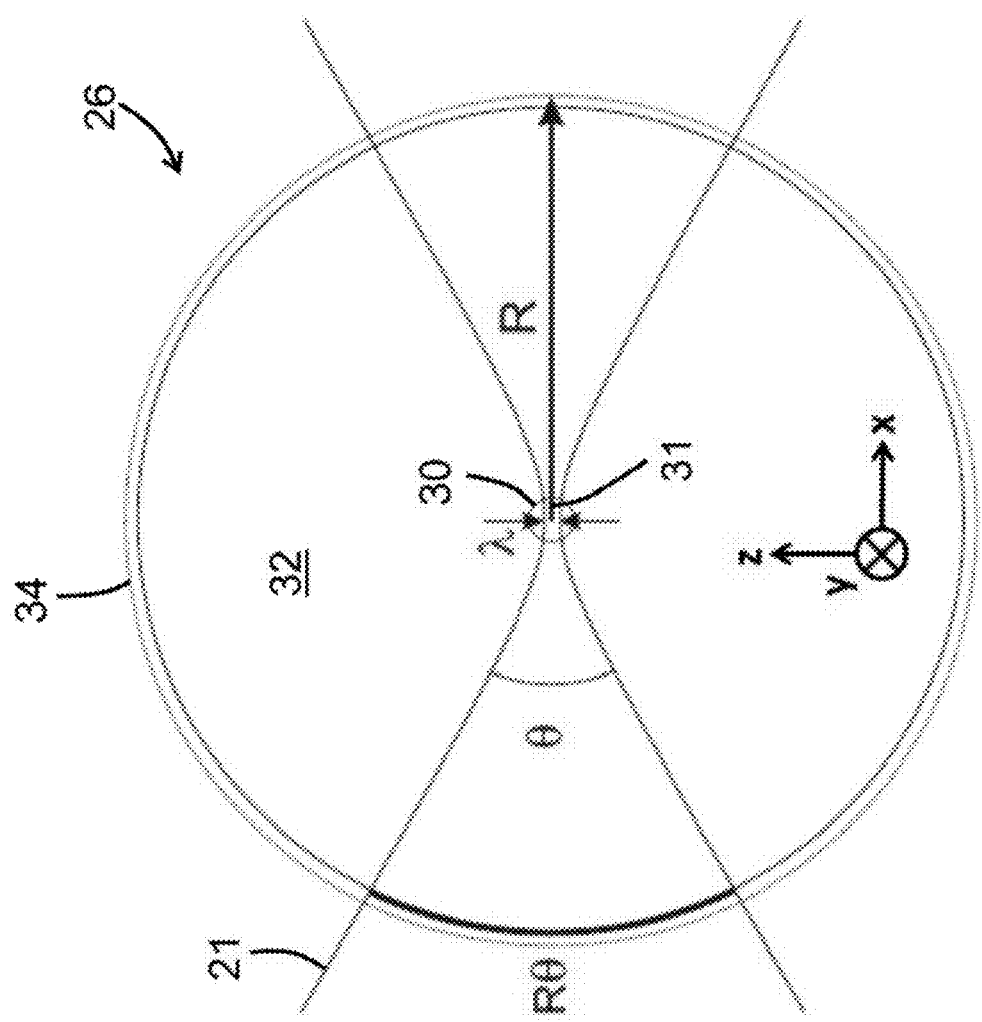
FIG. 2 is a schematic cross-section view of an optical fiber showing the parameters of the focussing geometry in the optical fiber.

The basic principle of cylindrical light focusing prevailing set-ups such as illustrated herein is illustrated in FIG. 2, where the optical fiber 26 is shown in cross-section. In the illustrated referential the Y axis corresponds to the propagation direction of the light beam of optical pulses writing the Bragg grating, the Y axis (perpendicular to the plan of the page) corresponds to the longitudinal axis of the optical fiber, and the Z axis is therefore perpendicular to the direction of the light beam in the cross-sectional plane. The light beam 21 is focussed on the grating region 31, here shown in the core 30 of the optical fiber 26, after passing through the polymer coating 34 and cladding 32. In typical embodiments, the light beam is tightly focussed such that the focus spot size (along the z axis) at the grating region 31 can be considered as nearly approaching the diffraction limit prescribed by the writing wavelength $\lambda$ and can be approximated as being equal to this writing wavelength for the sake of clarity and simplicity. One skilled in the art will readily understand that in other embodiments the spot size of the light beam at the grating region may be greater than the diffraction limit without departing from the scope of the invention, and that the considerations below may be seen as a simplification intended to highlight the relevant physical parameters. Under such conditions, the focused area A' of the light beam can be simply expressed as the product $\lambda \Delta y$ where $\Delta y$ represents an arbitrary infinitesimal fiber slice thickness (i.e. across the plane of FIG. 2). The corresponding incident beam area, A is given by $R\theta\Delta y$, where R is related to the fiber radius and $\theta$ to the focusing lens numerical aperture. In one embodiment, the WTC ratio, that is, the ratio between the beam intensity at the polymer vs its intensity at the fiber core where photo-inscription occurs, which can be simply expressed for a given incident power, by the ratio A/A'. Using the considerations above, the WTC ratio may be expressed in terms of the three basic physical parameters, R, $\lambda$ and $\theta$ as:

$$WTC = R\theta/\lambda \quad (3)$$

One skilled in the art will note that the WTC ratio is scales inversely with the writing wavelength $\lambda$.

The parameter R is mainly determined by the fiber radius and to a lesser extent by the thickness of the polymer coating. In some implementations the thickness of the polymer coating may therefore be taken into account when determining R, whereas in many case it may be considered negligible in comparison to radius of the optical fiber.

The parameter $\theta$ is typically mainly dictated by the focusing ability of the lens. Proper selection and design of the focussing components and geometry can provide a control on this parameter and therefore on the WTC ratio. In various implementations, the focussing geometry is preferably designed to maximize the focalisation of the light beam, and therefore maximize $\theta$ in order to increase the WTC ratio. In order to achieve such high focalisation while keeping the optical fiber very close to the phase mask, some embodiments may involve maximizing the numerical aperture of the lens 24 focussing the light beam on the grating region.

Referring back to FIG. 1, in one embodiment, the at least one focussing component may include an acylindrical focussing lens 24 disposed in the path of the optical pulses upstream the phase mask 28, and the method may therefore include propagating the light beam through such a lens. The profile of the acylindrical lens 24 may be selected in order to limit the spherical aberrations present when using short focal length cylindrical lenses, which causes a degradation of the focused beam quality. An acylindrical lens may provide the desired numerical aperture while preserving a sufficient quality of the light beam.

A spherical curvature along one or both directions transversal to the lens axis induces what is known as spherical aberrations, that is, beams parallel to, but distant from, the light propagation axis are focused in a slightly different place than beams close to the axis. It is known in the art to manufacture lenses in which the spherical surfaces are replaced by specially designed non-spherical surfaces, which provides the desired focussing effect while limiting spherical aberrations. Such lenses are referred to aspherical or acylindrical lenses. Advantageously, the use of such a lens, along with a properly conditioned light beam, may increase the focussing of the light beam, and therefore help to reach an intensity ratio between the fiber grating region and the polymer coating above the WTC limit. To illustrate this point, the achieved WTC intensity ratio using an acylindrical lens is compared, for different fiber diameters, to the achieved ratio using two different cylindrical lenses as compiled in TABLE 4 below:

TABLE 4

| Fiber diameter | WTC ratio acylindrical lens (f = 8 mm) | WTC ratio cylindrical lens (f = 12.7 mm) | WTC ratio cylindrical lens (f = 20 mm) |
| --- | --- | --- | --- |
| 125 μm | 100 | 50 | 16 |
| 80 μm | 65 | 25 | 10 |
| 50 μm | 40 | 15 | 6 |

Figure 3:
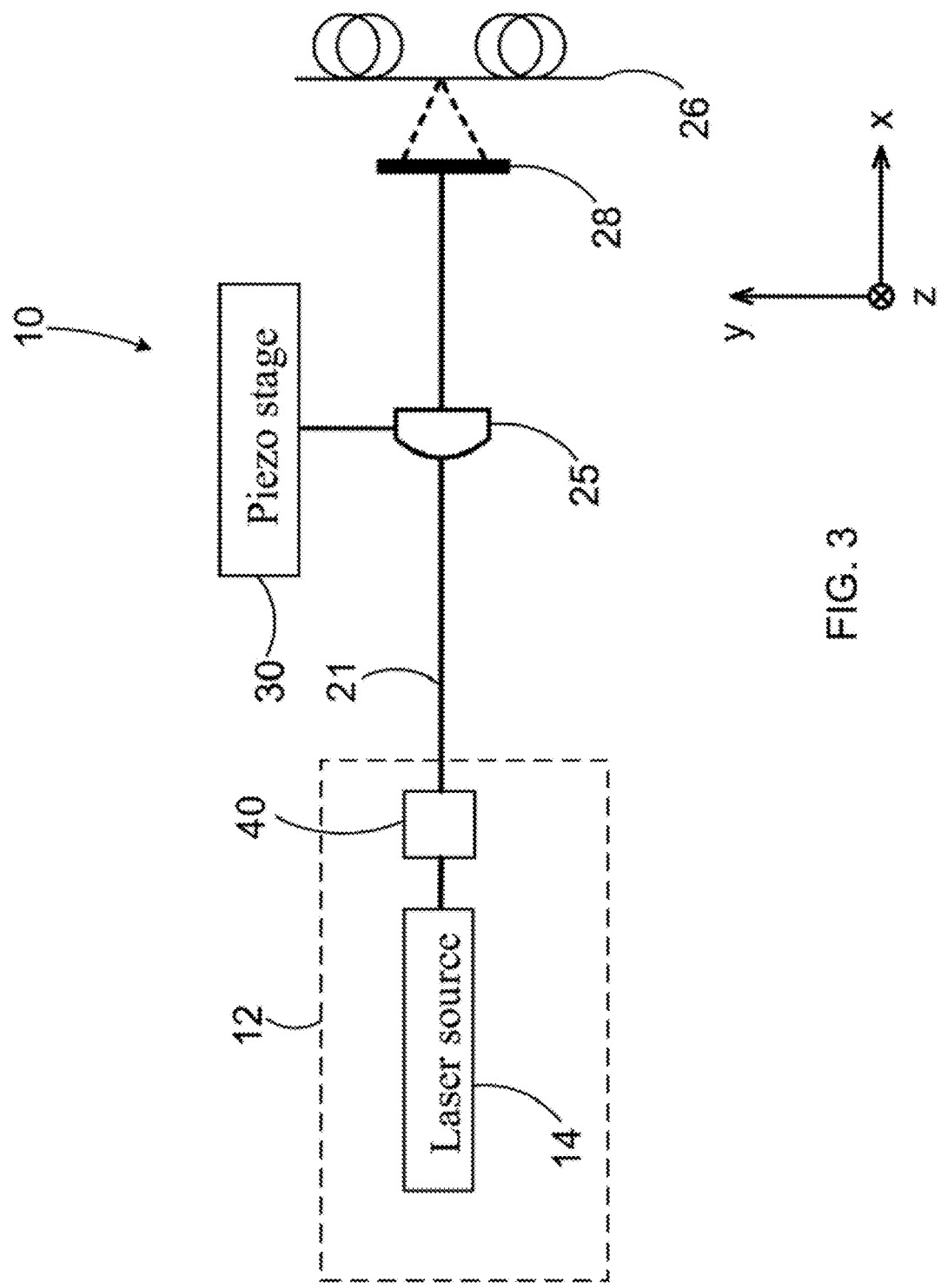
FIG. 3 is a schematic representation of an optical system for writing a Bragg grating in accordance with another embodiment.

In another embodiment, referring to FIG. 3, the at least one focussing component may include a cylindrical lens 25 combined with a beam shaping component 40 pre-compensating the light beam for optical aberrations induced by the cylindrical lens 25, such as the spherical aberrations mentioned above. The beam shaping component 40 may be part of the light generating module 12, as illustrated in FIG. 3, or positioned at any appropriate location upstream the cylindrical lens 25. The beam shaping component preferably modifies the spatial profile of the light beam 21 such that the focussing of the light beam on the writing region is greater than it would be using solely the cylindrical lens 25. The beam shaping component 40 may be embodied by a spatial pulse shaper adapted to affect the properties, namely the phase profile, of the light beam therethrough in the desired fashion. The spatial pulse shaper may for example be embodied by a combination of cylindrical and/or acylindrical lenses made of proper optical materials, graded index glass component, or a liquid crystal based device whose properties are adaptable through the application of a variable electrical field.

It will be readily understood that the quality of the light beam can directly affect the ability to reach a high focalization factor. In some embodiment, the laser light source 14 may for example be selected such that the generated light beam of optical pulses has a beam quality represented by a $M^2$ factor of 10 or smaller. Alternatively or additionally, beam conditioning components in the path of the light beam may be used to improve the beam quality after generation.

In some embodiments, the method may involve scanning the light beam along at least one axis transversal to a longitudinal axis of the optical fiber. The optical system may therefore include a suitable scanning mechanism for this purpose. As shown in both FIGS. 1 and 3, the scanning mechanism may for example include a piezoelectric stage 30, the acylindrical lens 24 or the cylindrical lens 25 being mounted on this piezoelectric stage 30 to scan the optical pulses 21 across the optical fiber 26.

Figure 4A:
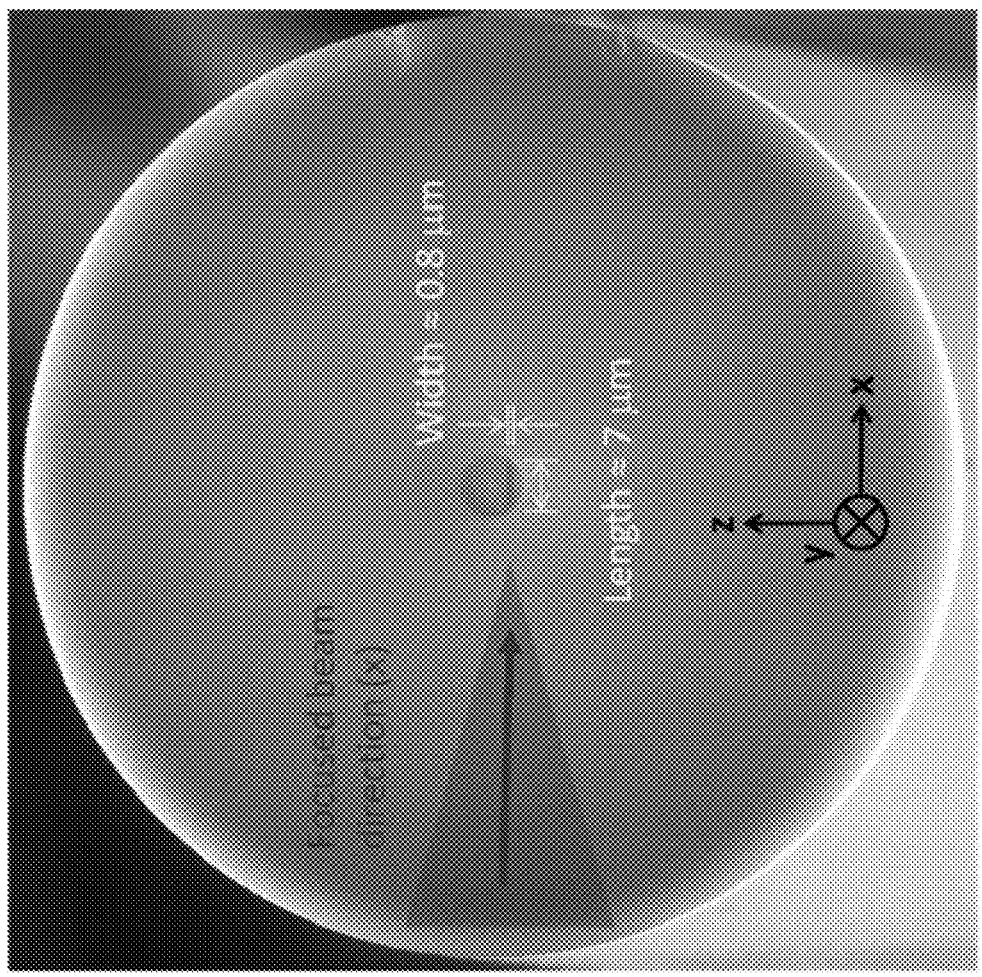
FIG. 4A is an SEM image of a Bragg grating written in an optical fiber using a method according to one embodiment.
Figure 4B:
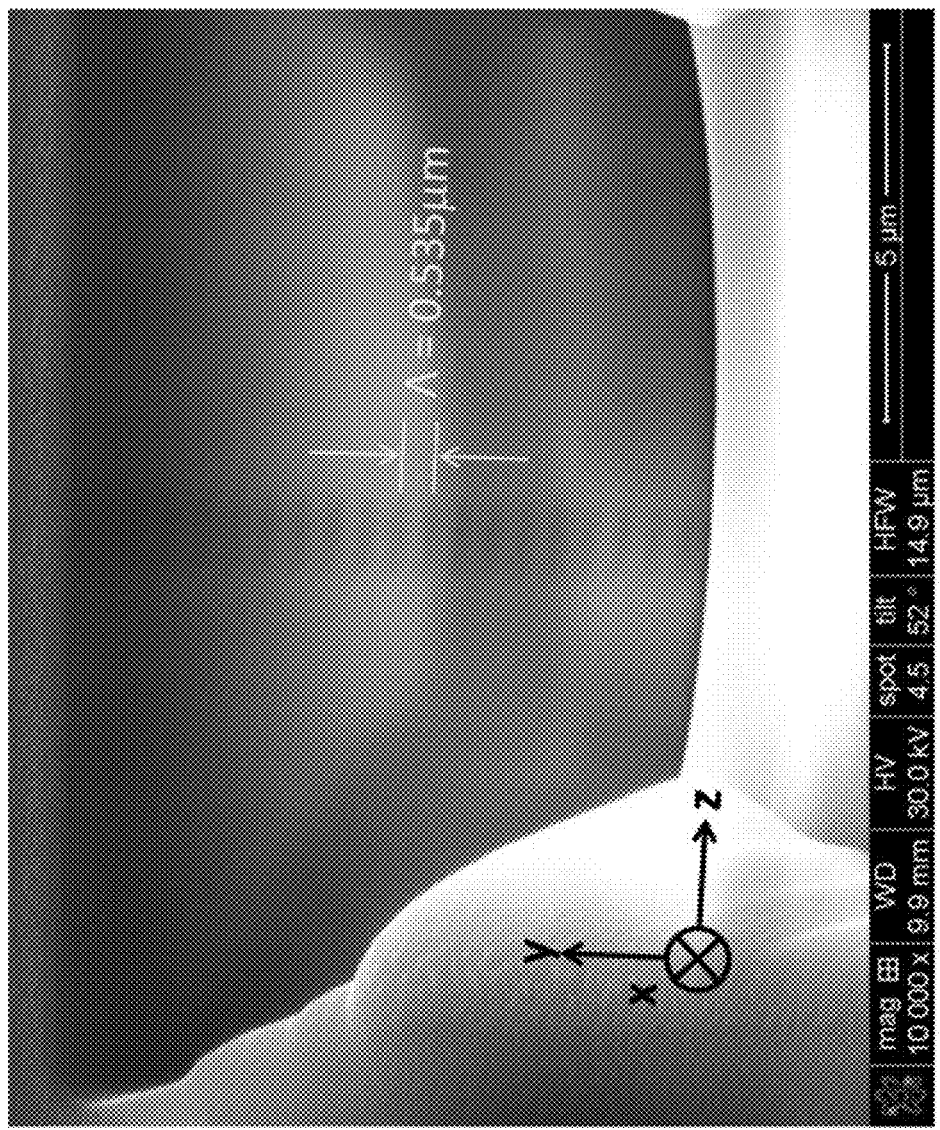
FIG. 4B is another image of the Bragg grating of FIG. 4A, enlarged and from a different perspective.
Figure 4C:
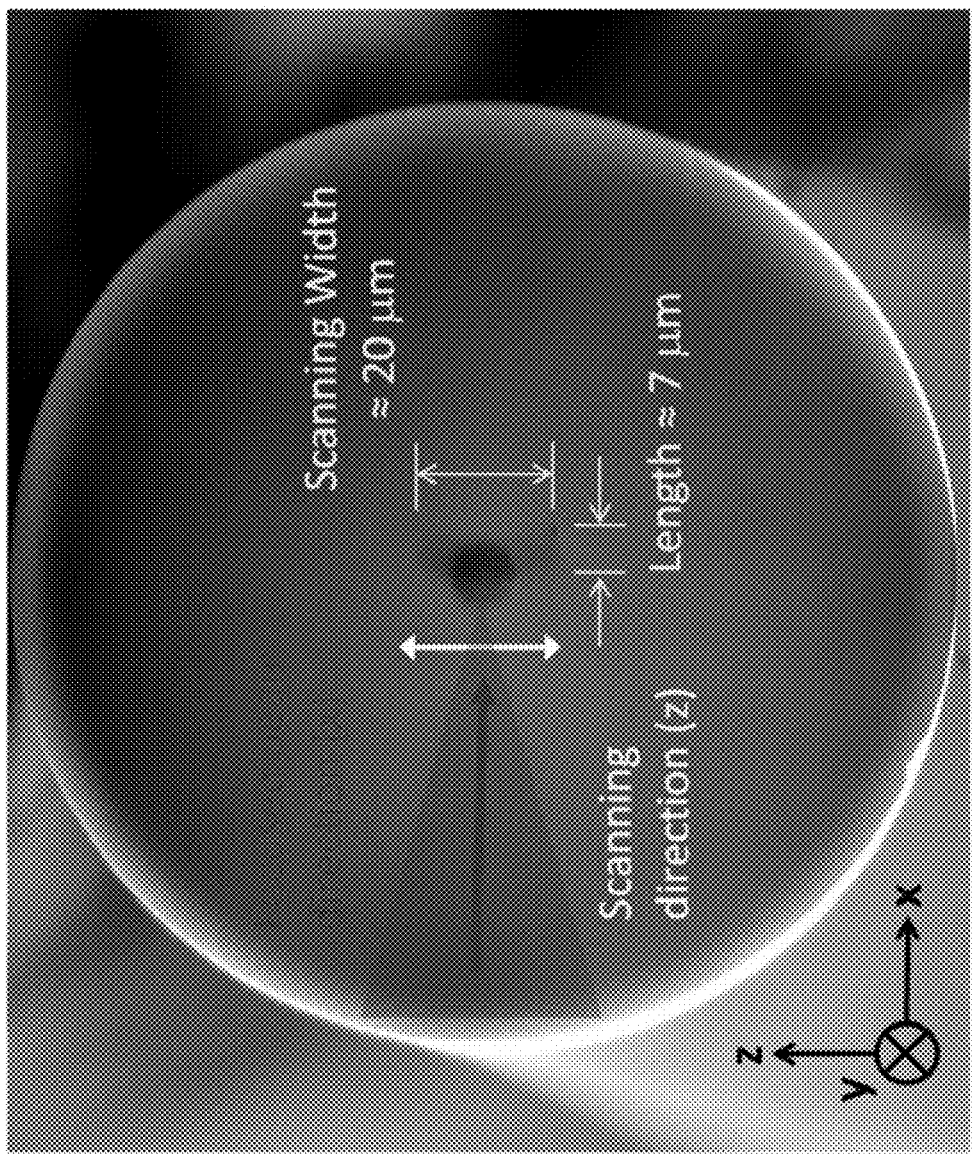
FIG. 4C is an SEM image of a Bragg grating written in an optical fiber using a method according to another embodiment.

Referring back to FIG. 2, as will be readily understood by one skilled in the art, the higher focussing of the light beam 21 according to embodiments of the invention may lead to the writing of a much localised grating within the grating region 31. In some embodiments, the resulting grating may be smaller than the core 30 of the optical fiber 26, and/or smaller than desired for a particular application. In other to obtain a grating covering a larger area, the light beam 21 may be scanned along axis X, axis Z, or both. The scanning of the light beam 21 will result in a physical extension of the area across the plane of the fiber transversal to its waveguiding axis Y. FIGS. 4A, 4B and 4C are SEM (Scanning Electron Microscopy) images of Bragg grating written in optical fibers according to embodiments of the invention. The reference system XYZ indicated in the drawings is the same as shown in FIGS. 1 to 3. FIGS. 4A and 4B show a grating written without scanning of the light beam, and it can be seen that this grating is very localized within a portion of the core of the fiber. FIG. 4C shows a grating written in similar conditions but for which the light beam has been scanned along the Z direction. It can be observed that the grating occupies a much larger area within both the core and the cladding of the optical fiber.

Although in both illustrated embodiment the scanning mechanism is illustrated as a piezoelectric stage on which the focussing lens is mounted, it will be readily understood that in other embodiments, other types of scanning mechanisms may be used, and other optical components of the optical system may be moved to scan the light beam. It will also be understood that in other embodiments, instead of scanning the light beam across the optical fiber, the light beam may remain fixed and the optical fiber itself may be moved with respect to this light beam to accomplish the same result.

In some implementations, the modification of the refractive index of the optical fiber in the manner described above may induce significant losses in the waveguiding properties of this fiber, most likely, but not necessarily, through photodarkening. In order to drastically reduce or eliminate these photoinduced losses, the method may include heating the grating region, after the inscription of the Bragg grating therein, for a period of time and according to a temperature profile jointly selected to suppress photoinduced losses in optical properties of the optical fiber. It has been found that performing such a heating step for an appropriate heating period, for example a few minutes, can substantially reduce, in some cases completely eliminate photoinduced losses while maintaining a large refractive index modulation defining the Bragg grating. The duration of the heating period depends on the heating temperature selected above said threshold, as well as the desired reduction in losses.

One skilled in the art will readily understand that photoinduced losses will be considered substantially eliminated if they are reduced to a level which is low enough to permit the use of the fiber in its targeted application. For a given reduction in losses, it has been found that the higher the temperature during the heating step, the shorter the required heating period. For example, heating the fiber to about 400° C. for 90 seconds has been found sufficient to eliminated photoinduced losses in ytterbium-doped silica fibers so that the grating may be used in high power laser applications. In fluoride glass, a heating step of 10 minutes at 100° C. was found to provide good results. The required heating period for a given embodiment may be experimentally predetermined, or, in some embodiments, the transmission properties of the fiber at wavelengths where it is known to suffer from losses can be monitored during annealing to detect the change in losses.

Figure 10A:
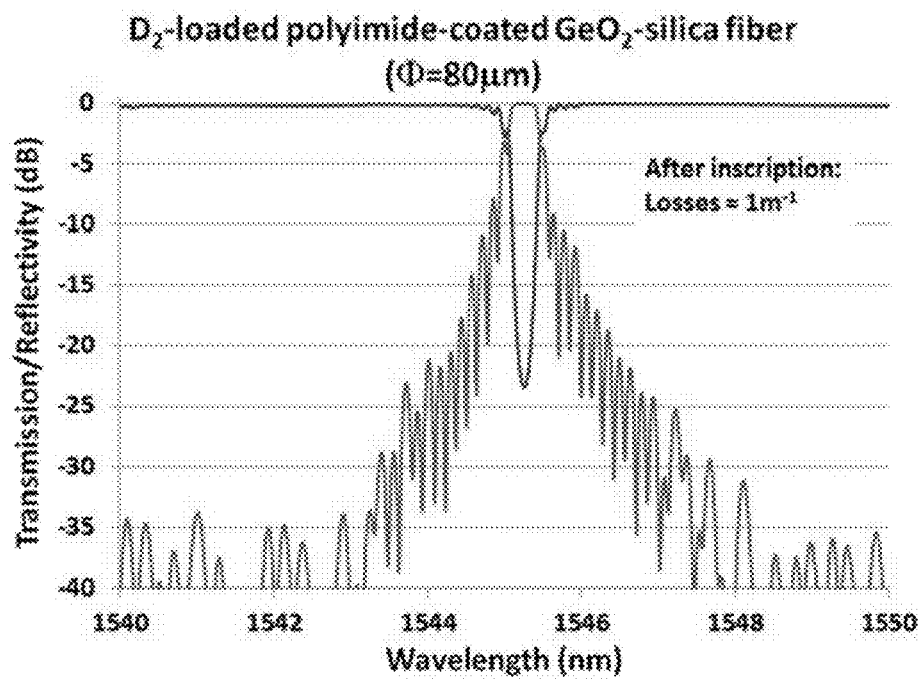
FIGS. 10A and 10B show the transmission and reflectivity spectra of a Bragg grating written in an 80 µm deuterium-loaded GeO2-silica (Fibercore, model SM1500(5.1/80)P) fiber having a polyimide coating, respectively before and after thermal annealing at 400° C. for 10 minutes.
Figure 10B:
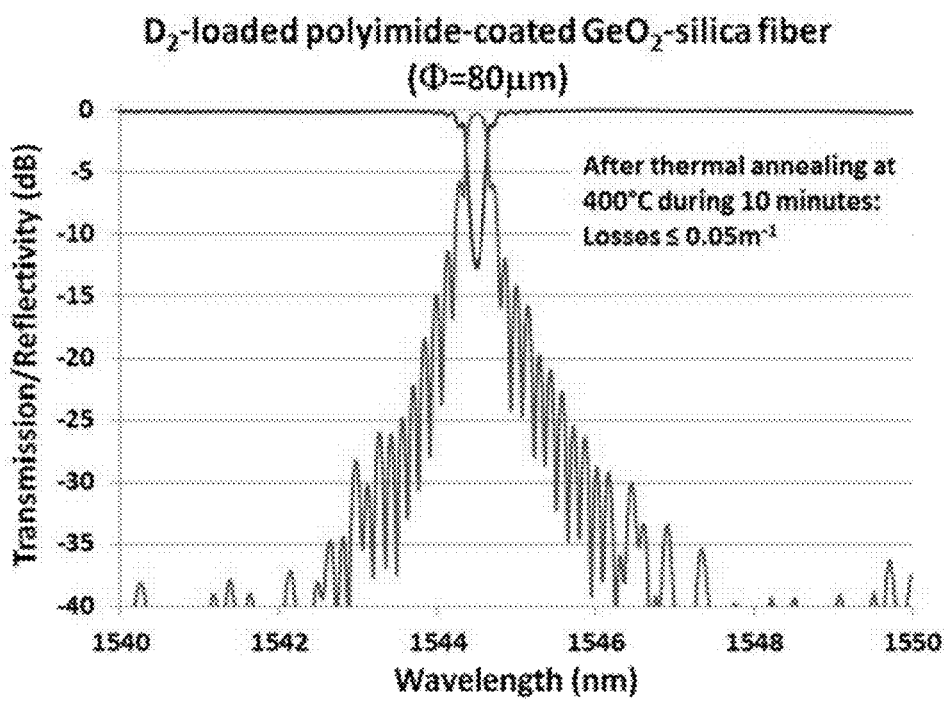

The region of the fiber can be heated through any appropriate mechanism. Preferably, the heating mechanism is selected such that it does not damage the structural integrity of the fiber and its polymer coating. In one embodiment, the fiber may be heated through the propagation of a light beam in the 300-1200 nm wavelength range of sufficient intensity therein, which could advantageously be done without the need of removing the fiber polymer coating. In some embodiments, the optical fiber can be put in an oven whose temperature is ramped up to the desired value. This last technique may be useful for cases where the polymer coating can remain undamaged at the maximum temperature of the annealing process. For example, polyimide coatings may be heated to up to 400° C. without substantially affecting retaining their mechanical strength. As an example, FIG. 10A shows the spectra of a grating written in a polyimide-coated deuterium-loaded $GeO_2$-silica optical fiber for which the induced index modulation is accompanied with photoinduced losses of 1 $m^{-1}$. FIG. 10B shows the spectra of the same grating after a heating step at 400° C. for 10 minutes which results in at least a 20-fold reduction in the photoinduced losses while maintaining a significant refractive index modulation.

In accordance with another aspect, there are provided optical fibers having a Bragg grating permanently photoinduced therein according to the method described herein or equivalents thereof. The optical fiber includes a core and at least one cladding, and the Bragg grating extends across at least a portion of the core of the optical fiber, and optionally a portion of the cladding as well. The Bragg grating results from exposure of the grating region to ultrafast light pulses as explained above. The optical fiber further includes a pristine polymer coating, that is, the polymer coating is intact and undamaged, either by removal and recoating or by exposure to a light beam above the damage threshold.

In accordance with one implementation, there is provided an optical fiber having Bragg grating along a non-photosensitized grating region thereof. As one skilled in the art will readily understand, the expression "non-photosensitized" refers to an optical fiber which has not undergone a modification for the purpose of improving the photosensitivity of its core or cladding, such as hydrogen-loading. The optical fiber has a pristine polymer coating around the grating region. The reference to a "pristine" coating refers herein to the polymer coating originally provided around the optical fiber at manufacture, the fiber not having been subjected to stripping and recoating, and the polymer coating having remained unaffected by the FBG writing process. The polymer coating may be made of any of the polymer materials mentioned above, such as acrylate or fluoroacrylate, polyimide, silicone, polytetrafluoroethylene, an organically modified ceramic and the like. The optical fiber is characterized by a mechanical resistance greater than 20% of a mechanical resistance of an identical grating-free optical fiber. In other words, the mean strain at breakage of the optical fiber provided with the Bragg grating photoinduced through the coating is more than 20% of what the strain at breakage would be for the same optical fiber prior to inscription of the grating. Preferably, the Bragg grating is characterized by a fundamental Bragg resonance. As mentioned above, the only previously-reported instance of WTC for unloaded optical fibers did not maintain the polymer coating in pristine condition, and additionally provided only a third order Bragg resonance.

In accordance with another implementation, there is provided an optical fiber having a Bragg grating along a photosensitized grating region thereof. The photosensitized region is preferably a hydrogen- or deuterium-loaded portion of the core and/or cladding of the optical fiber. The optical fiber has a polymer coating around the grating region, as defined above. In this embodiment the polymer coating is made of an acrylate material. It will be readily understood that acrylate materials encompass fluoroacrylates. The optical fiber is characterized by a mechanical resistance greater than 85% of a mechanical resistance of an identical grating-free optical fiber as explained above. In some implementation, the mechanical resistance of the optical fiber is at least 99% of the mechanical resistance of an identical grating-free optical fiber, that is, the mechanical resistance of the fiber is virtually unaffected by the FBG writing process.

In accordance with yet another implementation, there is provided an optical fiber having a Bragg grating along a photosensitized grating region thereof, the optical fiber has a pristine polyimide polymer coating around the grating region. In this case, the optical fiber is characterized by a mechanical resistance greater than 50% of a mechanical resistance of an identical grating-free optical fiber. In some implementations, the mechanical resistance of the optical fiber is at least 99% of the mechanical resistance of an identical grating-free optical fiber.

EXAMPLES

Embodiments of the invention have been used by the inventors to write FBGs through the fiber coating. Using femtosecond pulses at a wavelength around 800 nm combined with the phase-mask technique and an appropriate focusing configuration, fundamental order fiber Bragg gratings with refractive index modulation in excess of $1 \times 10^{-3}$ were written through both the acrylate and polyimide coating of unloaded standard silica fibers without noticeable degradation of mechanical strength. Of course, these results are provided by way of illustration only in should not be considered as limiting to the scope of the invention.

The experimental setup used to write the FBGs was similar to the one shown in FIG. 1. A Ti:sapphire regenerative amplifier system (Coherent, model Legend-HE) that produces pulses with 3.5 mJ of energy at a repetition rate of 1 kHz with a central wavelength of 806 nm was used. The temporal width of the Fourier-transform-limited pulses was measured to be about 34 fs. The light beam outputted by the laser system was used directly to write the FBGs (i.e. without spatial reshaping), and had a diameter of 8.5 mm (at $1/e^2$) and a $M^2$ specified below 1.3. A variable optical attenuator was used to precisely adjust the energy delivered to the fiber. The beam was directly focused using a an acylindrical lens with a focal length of 8 mm (Thorlabs AYL108-B) through a uniform silica phase mask onto the fiber positioned along the focal line and in close proximity to the phase mask. The uniform phase mask had a pitch of 1070 nm and was fabricated in-house by holographic lithography on a UV-grade fused silica substrate. The zero order of diffraction at 800 nm for the polarization perpendicular to the corrugations was measured to be 15%. Such defect to nullify the zero-order is not an issue with fs laser pulses since the group velocity walk-off effect spatially separates the zero from the ±1 orders after a short propagation distance of the fs laser pulses beyond the phase-mask. A pure two-beam interference pattern can be obtained after a propagation of about 50-75 μm from the phase-mask by considering the phase-mask pitch and the input pulse duration. The optical fiber was placed at about 125 μm from the phase-mask to ensure that the walk-off condition is respected. Since the transverse interaction diameter of the focused beam is about 1 μm in width as compared to a typical 8 μm fiber core diameter, the focusing lens was mounted on a piezoelectric translation stage and the beam was scanned transversally to the fiber section at a frequency of 1 Hz with scanning amplitude set to 20 μm. This ensured a maximal overlap between the grating and the propagating mode in the optical fiber to be reflected by Bragg grating.

In this configuration, for a 125 μm diameter fiber under the specified experimental conditions, the intensity ratio between the grating region in the core of the optical fiber and the polymer coating was numerically evaluated to be around 100 using commercial optical design software (ZEMAX™).

Figure 5A:
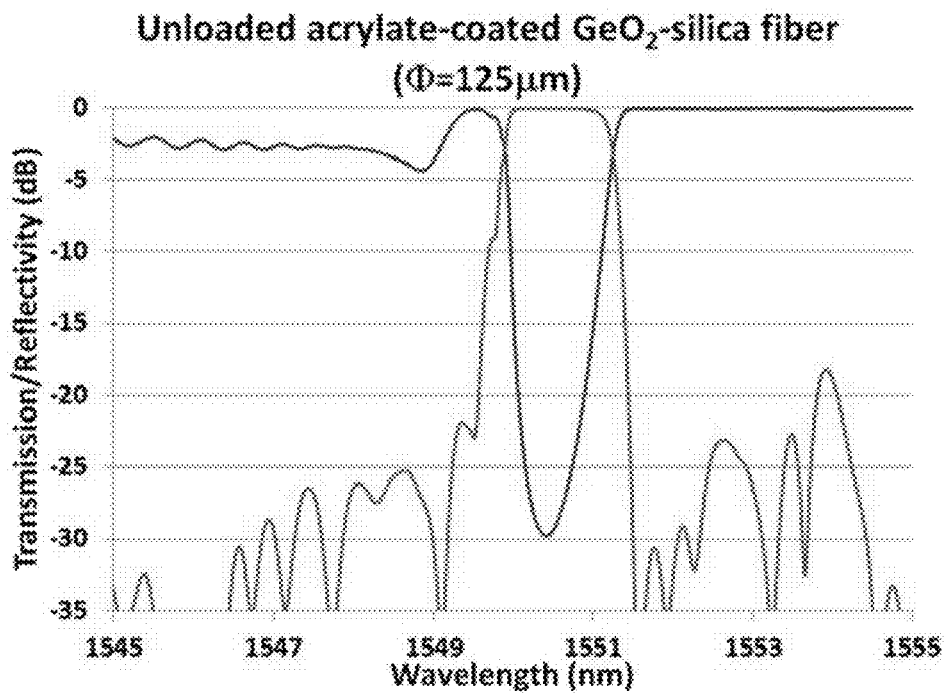
FIG. 5A shows the transmission and reflectivity spectra of a FBG written through the acrylate coating of an unloaded SMF28 fiber at an input pulse energy of 75 µJ after an exposure time of 60 s.
Figure 5B:
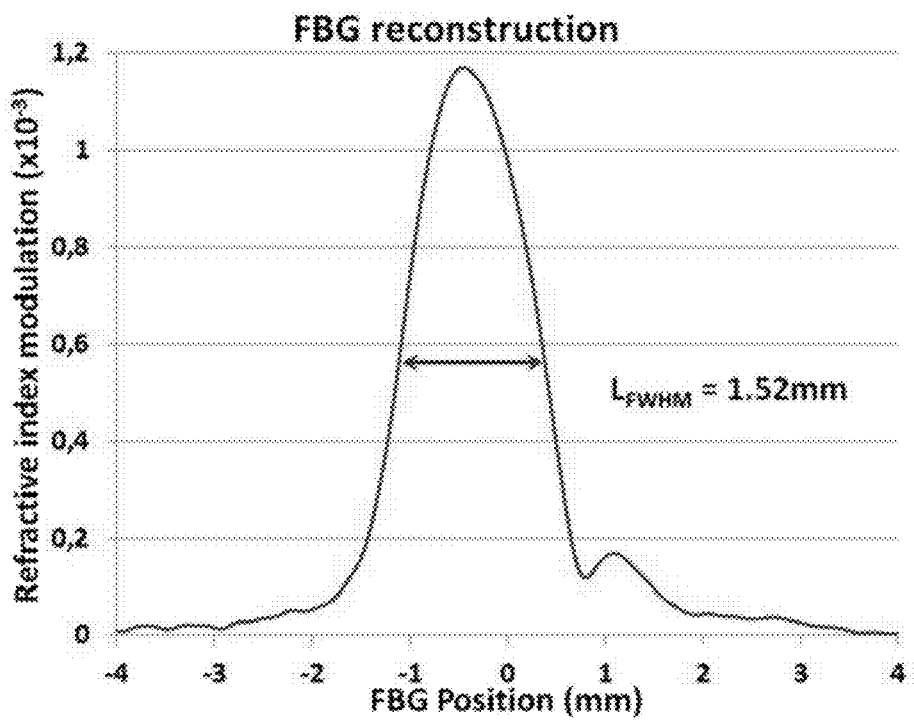
FIG. 5B shows the corresponding refractive index modulation reconstruction.

The first type of optical fiber evaluated with the WTC process was acrylate-coated standard telecommunication fiber (i.e. SMF28) which was not hydrogen or deuterium-loaded prior to FBG exposure. FIG. 5A shows the transmission/reflectivity spectra of a resulting FBG obtained at a pulse energy incident to the lens of 75 μJ after an exposure time of 60 seconds. FIG. 5B presents the refractive index modulation reconstruction of the FBG presented in FIG. 5A which will be detailed below.

As shown in FIG. 5A, a maximum insertion loss of −30 dB was obtained at 1550.4 nm, which corresponds to a FBG peak reflectivity of 99.9%. In order to evaluate the induced refractive index modulation along the FBG, a precise characterization of its spectral and temporal responses was performed using a swept laser-based JDSU OMNI system using the modulation phase-shift method. The acquired transmission, reflectivity and phase spectra were used to reconstruct the refractive index modulation using an appropriate inverse layer peeling algorithm. The resulting FBG refractive index modulation reconstruction is shown in FIG. 5B, yielding a maximum $\Delta n_{AC}$ of $1.16 \times 10^{-3}$ with a Gaussian shape of 1.52 mm in length at FWHM. Such a FBG length is significantly smaller than the input Gaussian beam having a FWHM length of 5.0 mm (8.5 mm at $1/e^2$). This can be explained since only a short part of the exposure beam is above the writing threshold, which limits the effective FBG length to about 30% of the total exposure beam length.

In order to evaluate the mechanical strength of the resulting components, a batch of 12 FBGs with refractive index modulations within ±10% of the FBG presented in FIG. 5A were fabricated under the same experimental conditions. Their breaking stress was monitored using a commercial pull-tester unit (Chatillon, model TCD110) adjusted to a pulling rate of 5%/min. The same procedure was performed with 13 samples of pristine SMF28 fiber. The cumulative failure probability along the breaking stress was then compiled for both cases and the resulting Weibull plot is presented in FIG. 6.

Figure 6:
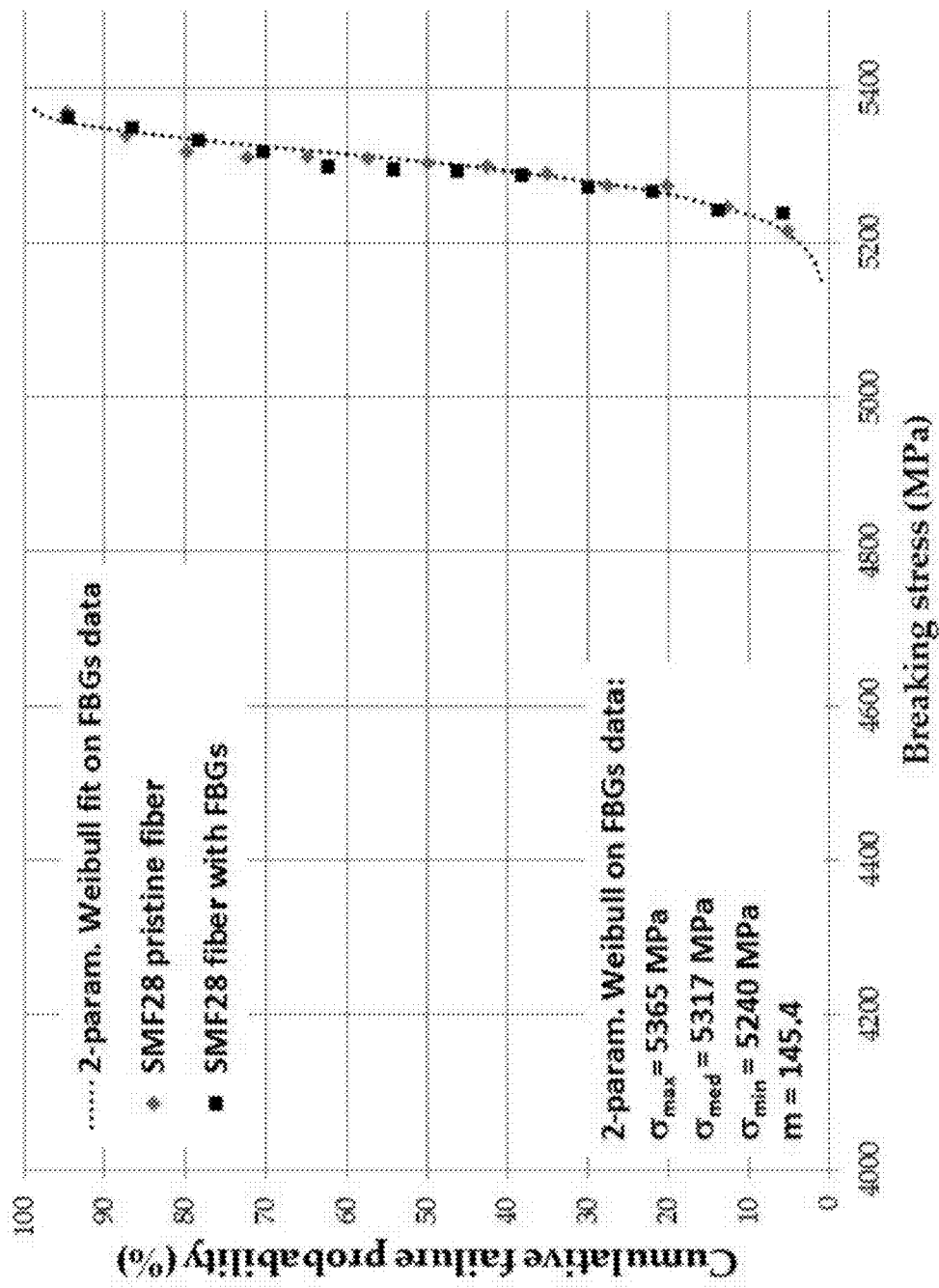
FIG. 6 shows the Weibull plot of SM F28 fibers in which gratings according to the embodiment of FIG. 5A were written.

One can observe from FIG. 6 that there was no significant degradation of the mechanical strength of the fiber resulting from the FBG WTC process. The 12 FBG samples tested yielded a stress at failure greater than 5200 MPa. A 2-parameter Weibull distribution was also computed on the FBG data and is presented with dashed lines in FIG. 6. A slope (m) parameter of 146 was obtained with a median breaking stress of 5317 MPa. For comparison, the pristine fiber yielded an 'm' parameter of 152 with a median breaking stress of 5314 MPa.

Figure 7A:
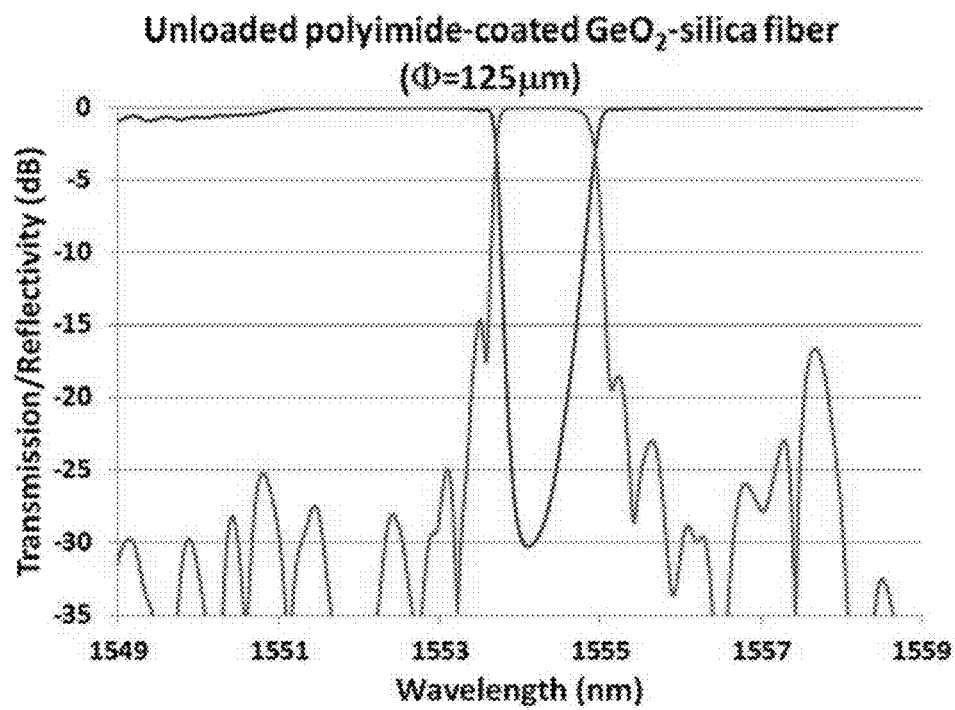
FIG. 7A shows the transmission and reflectivity spectra of a FBG written through the polyimide coating of an unloaded OFS fiber at an input pulse energy of 75 µJ after an exposure time of 65 s.
Figure 7B:
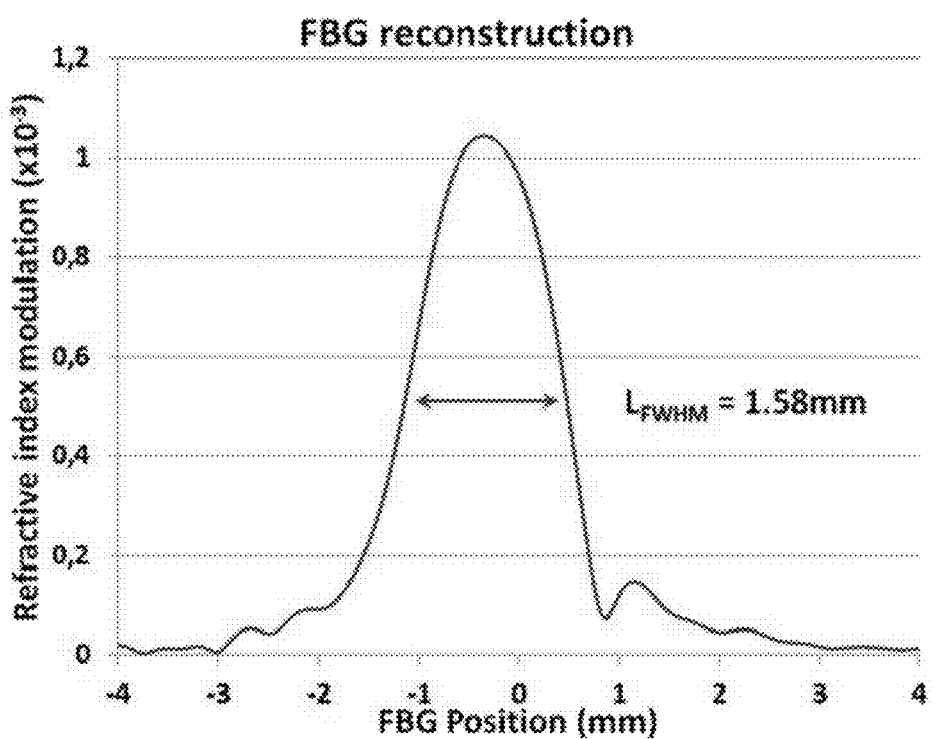
FIG. 7B shows the corresponding refractive index modulation reconstruction.

Unloaded polyimide-coated silica fiber (OFS, model BF06160-02) was also evaluated under the WTC process using the same procedure detailed above. This fiber has a core/clad/coating diameter of 4.6/125/155 μm and a numerical aperture of 0.21. FIG. 7A shows the transmission/reflectivity spectra of a resulting FBG obtained at a pulse energy incident to the lens of 75 μJ after an exposure time of 65 seconds. FIG. 7B presents the corresponding refractive index modulation reconstruction.

Similarly to what was obtained in the SMF28 fiber, a maximum insertion loss of −30 dB was reached at 1554.0 nm after an exposure time of 65 seconds. The resulting FBG refractive index modulation reconstruction is shown in FIG. 7B yielding a maximum refractive index modulation of $1.05 \times 10^3$ with a FWHM length of 1.58 mm. One can note that the higher numerical aperture of the polyimide-coated fiber results in a higher Bragg wavelength of 1554.0 nm as compared to the 1550.4 nm obtained in lower numerical aperture SMF28 fiber. The higher germanium content in the fiber core required to increase the numerical aperture appears to compensate for the presence of the polyimide coating to reach a level of photosensitivity about the same as for the acrylate-coated SMF28 fiber.

A batch of 10 FBGs with refractive index modulations within ±10% of the FBG presented in FIG. 7A was fabricated under the same experimental conditions. These 10 units as well as 10 samples of the pristine fiber were pull-tested to quantify their mechanical strength using the same method described previously. The cumulative failure probability along the breaking stress is presented in FIG. 8.

Figure 8:
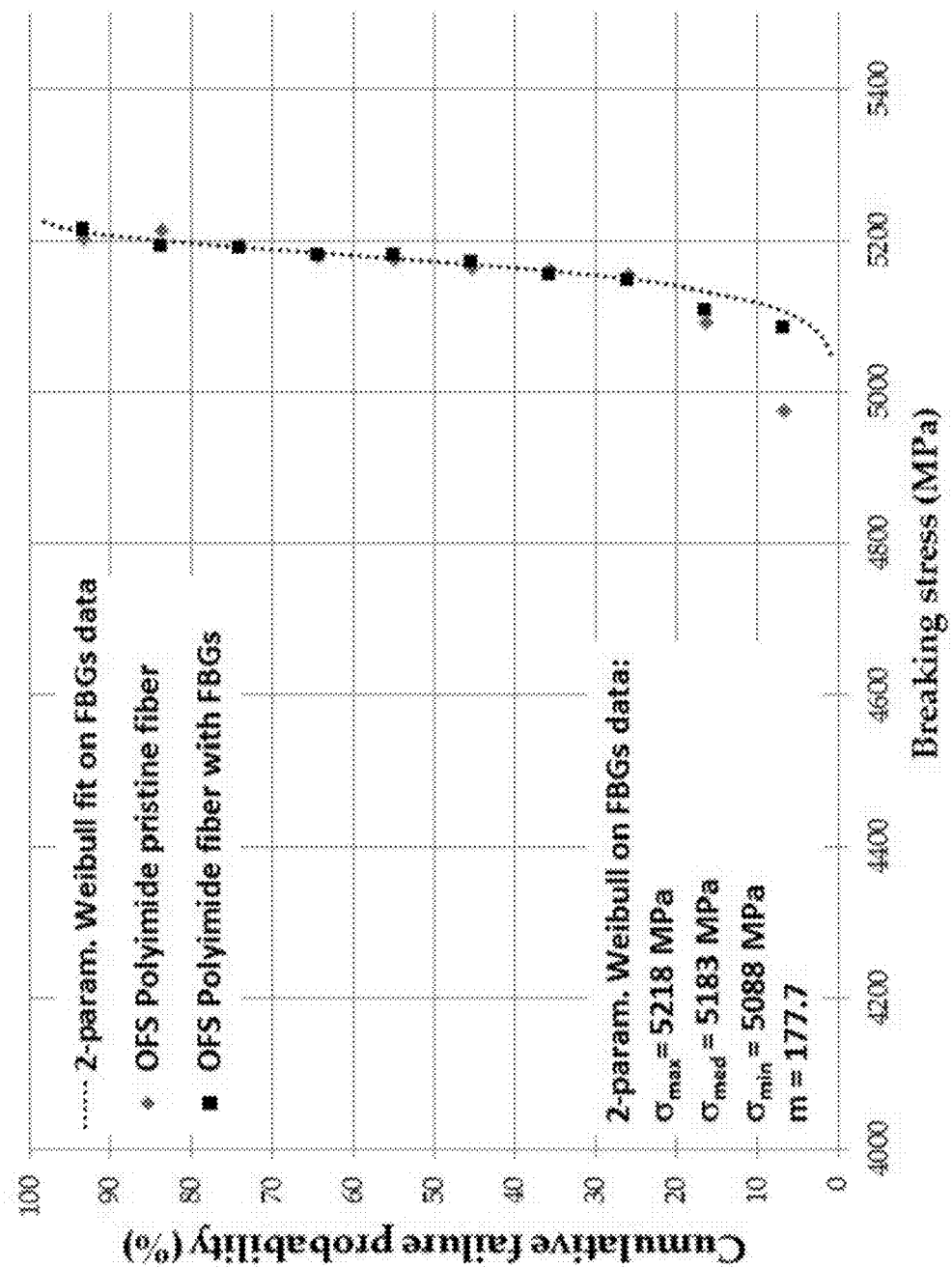
FIG. 8 shows the Weibull plot of OFS Polyimide fibers in which gratings according to the embodiment of FIG. 7A were written.

One can observe from FIG. 8 that, similarly to what was obtained with SMF28, there was no significant degradation of the fiber's mechanical strength resulting from the FBG WTC process. The 10 FBG samples tested yielded a stress at failure greater than 5000 MPa. A 2-parameter Weibull distribution was also computed on the FBG data and is presented with dashed lines in FIG. 8. A slope (m) parameter of 176 was obtained with a median breaking stress of 5183 MPa.

Finally, the experimental conditions were adapted for testing WTC in polyimide-coated pure silica core fiber which is known to be less photosensitive to 800 nm fs-pulses than germanium-doped silica fibers. The fiber sample (Fibercore, model SM1500SC(9/125)P) had a core/clad/coating diameter of 9/125/145 μm and a numerical aperture of 0.14. Such fiber was designed to be hydrogen darkening-resistant and therefore particularly suitable for fiber sensing in harsh environments. A fiber sample was exposed under similar experimental conditions as the other tested fibers but the input energy was increased gradually to reach the writing threshold. A significant grating growth was obtained at an input pulse energy of 90 μJ, about 20% higher than the corresponding exposure energy used for WTC in SMF28 and polyimide-coated fibers. The transmission and reflectivity spectra of a saturated FBG fabricated after an exposure time of 600 s is presented in FIG. 9.

Figure 9:
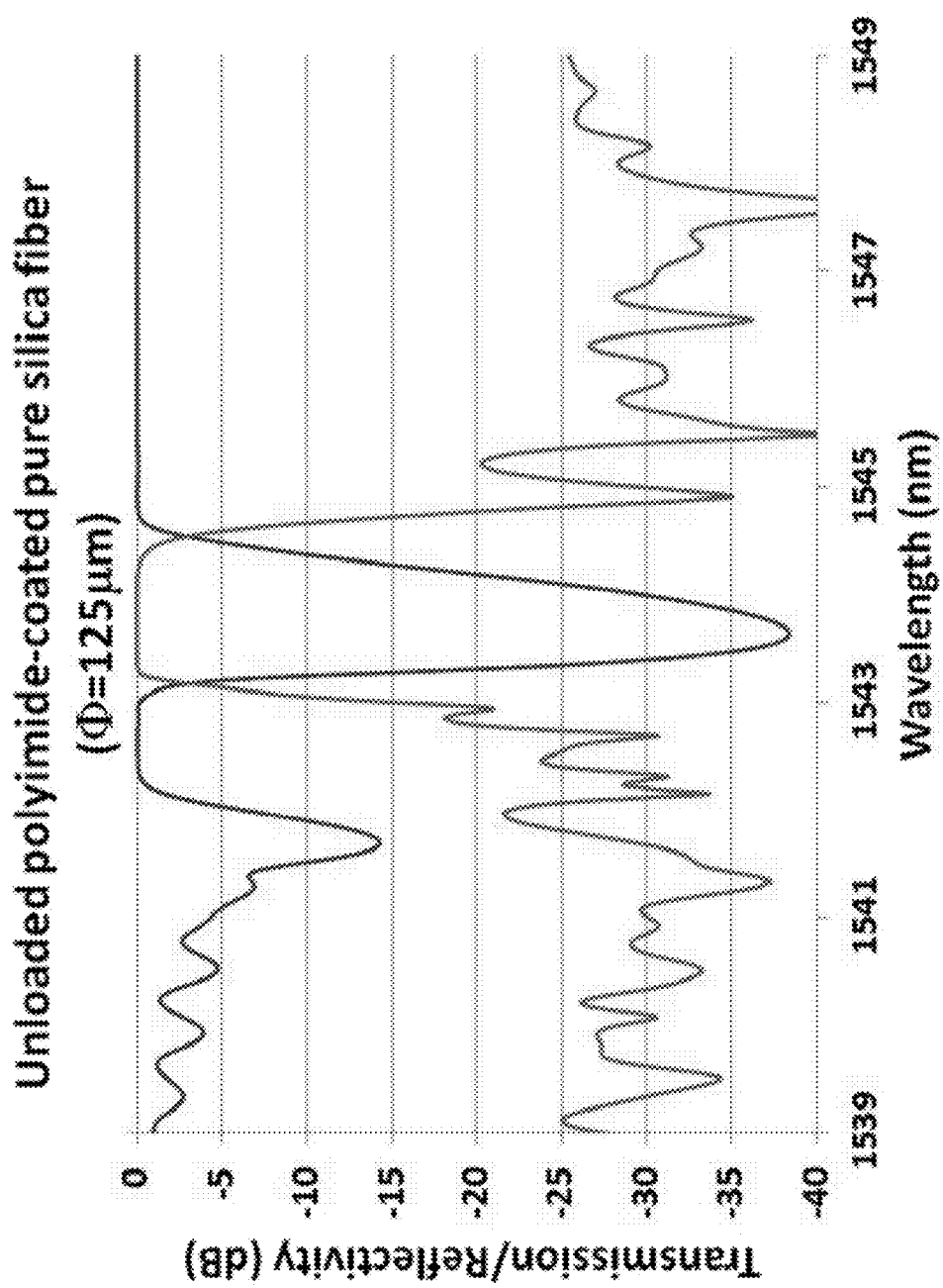
FIG. 9 shows the transmission and reflectivity spectra of a saturated FBG written through the polyimide coating of an unloaded pure silica core fiber (Fibercore, model SM1500SC(9/125)P) at an input pulse energy of 90 µJ after an exposure time of 600 s.

As shown in FIG. 9, a maximum insertion loss of −38.4 dB was obtained at 1543.6 nm after an exposure time of 600 s. The corresponding saturated refractive index modulation was evaluated at 1.2×10-3 with a FBG length of 1.7 mm at FWHM. One can note that, as expected, the pure silica core fiber results in a lower Bragg wavelength of 1543.6 nm as compared to the 1550.5 nm obtained in SMF28 fiber. The mechanical strength of two FBGs written under similar experimental conditions was tested using the same method described above yielding a breaking stress of 3284 and 3928 MPa, values in the range of the breaking stress of the pristine fiber measured to be 3500±500 MPa. The number of pull tests carried out was limited due to fiber availability. This result confirms that increasing both the input pulse energy by 20% and exposure time by an order of magnitude does not significantly affect the mechanical reliability of the resulting FBGs.

Figure 11:
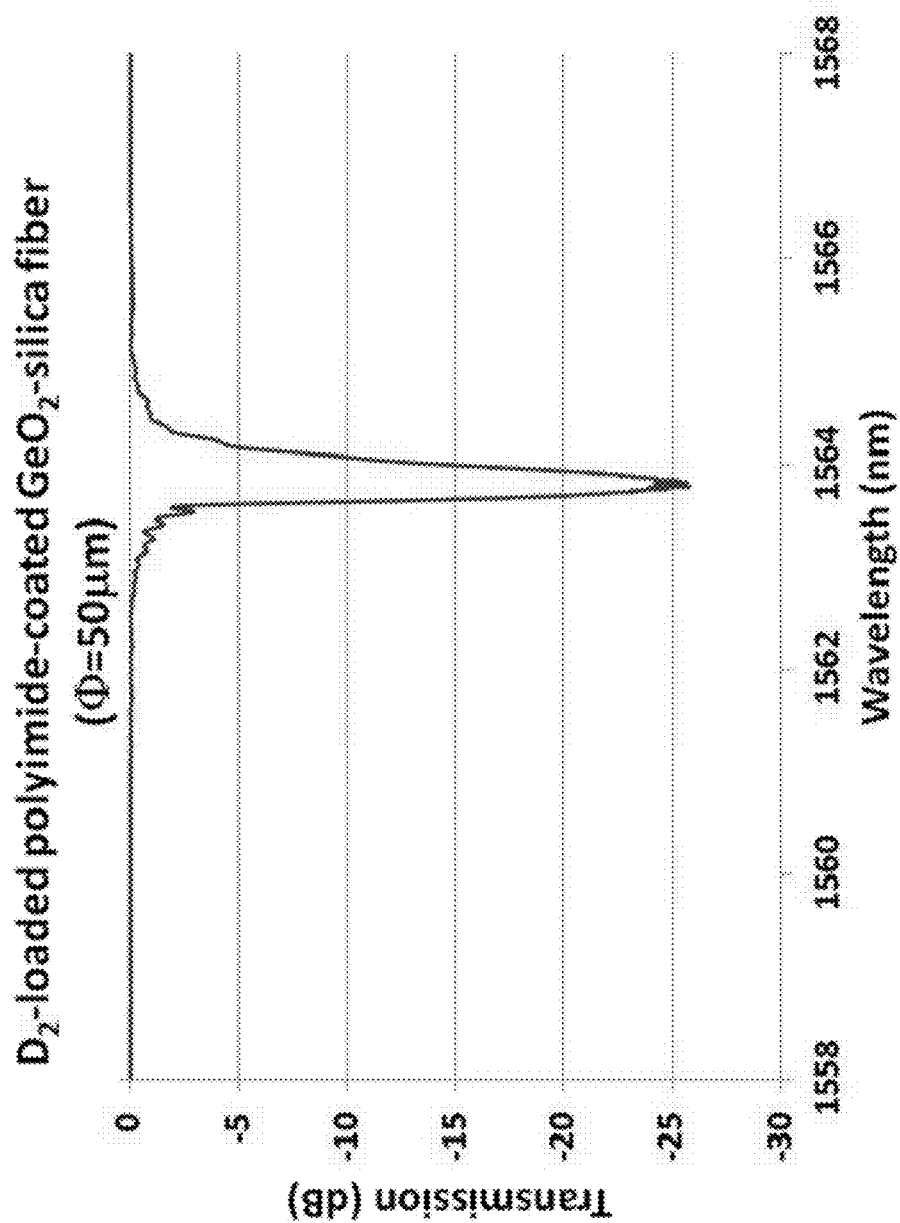
FIG. 11 shows the transmission and reflectivity spectra of a Bragg grating written in a 50 µm deuterium-loaded GeO2-silica fiber (Fibercore, model SM1500(4.2/50)P) having a polyimide coating.

The writing of FBGs using techniques according to embodiments of the invention has also been accomplished in a 80 μm deuterium-loaded GeO2-silica fiber having a polyimide coating (Fibercore, model SM1500(5.1/80)P). FIGS. 10A and 10B show the resulting transmission and reflectivity spectra, respectively before and after thermal annealing at 400° C. for 10 minutes. Further results were obtained for a 50 μm fiber of the same composition (Fibercore, model SM1500(4.2/80)P), and the resulting transmission spectra is shown in FIG. 11.

Of course, numerous modifications could be made to the embodiments above without departing from the scope of the invention.

The invention claimed is:

1. A method for writing a Bragg grating along a grating region of an optical fiber through a polymer coating of the optical fiber, comprising:
   impinging a light beam of ultrafast optical pulses on the grating region of the optical fiber through the polymer coating, the ultrafast optical pulses being characterised by a writing wavelength at the grating region to which the polymer coating is substantially transparent;
   diffracting the light beam through a phase mask so as to form an interference pattern defining the Bragg grating at the grating region of the optical fiber; and
   focussing the light beam such that an intensity of the optical pulses is below a damage threshold within the polymer coating, and above an FBG inscription threshold within the grating region of the fiber.

2. The method according to claim 1, wherein the ultrafast optical pulses have a duration of less than 2 picoseconds.

3. The method according claim 1, wherein the phase mask has a pitch selected to favour a fundamental Bragg resonance of the Bragg grating.

4. The method according to claim 1, wherein the grating region is entirely located within a core of the optical fiber.

5. The method according to claim 1, wherein the grating region is located within a core of the optical fiber and a portion of a cladding of the optical fiber surrounding the core.

6. The method according to claim 1, wherein the focussing of the light beam comprises propagating the light beam through an acylindrical focussing lens.

7. The method according to claim 1, wherein the focussing of the light beam comprises propagating the light beam through a cylindrical lens combined with a beam shaping component pre-compensating the light beam for optical aberrations induced by said cylindrical lens.

8. The method according to claim 1, further comprising scanning the light beam along at least one axis transversal to a longitudinal axis of the optical fiber.

9. The method according to claim 1, further comprising heating the grating region for a period of time and according to a temperature profile jointly selected to suppress photoinduced losses in optical properties of the optical fiber.

10. An optical system for writing a Bragg grating along a grating region of an optical fiber through a polymer coating of the optical fiber, comprising:
   a light generating module generating a light beam of ultrafast optical pulses impinging on the grating region of the optical fiber through the polymer coating;
   a phase mask disposed in a path of the light beam and diffracting the light beam so as to form a grating pattern at the grating region of the optical fiber;
   at least one focussing component disposed in a path of the light beam upstream the phase mask and focussing the light beam such that an intensity of the optical pulses is below a damage threshold within the polymer coating, and above an FBG inscription threshold within the grating region of the fiber.

11. The optical system according to claim 10, wherein the ultrafast optical pulses have a duration of less than 2 picoseconds.

12. The optical system according to claim 10, wherein the phase mask has a pitch selected to favour a fundamental Bragg resonance of the Bragg grating.

13. The optical system according to claim 10, wherein the grating region is entirely located within a core of the optical fiber.

14. The optical system according to claim 10, wherein the grating region is located within a core of the optical fiber and a portion of a cladding of the optical fiber surrounding the core.

15. The optical system according to claim 10, wherein the at least one focussing component comprises an acylindrical focussing lens.

16. The optical system according to claim 10, wherein the at least one focussing component comprises a cylindrical lens and a beam shaping component disposed upstream the cylindrical lens, the beam shaping component pre-compensating the light beam for optical aberrations induced by said cylindrical lens.

17. The optical system according to claim 10, further comprising a scanning mechanism configured for scanning the light beam along at least axis transversal to a longitudinal axis of the optical fiber.

18. The optical system according to claim 15, further comprising a scanning mechanism configured for scanning the light beam along at least axis transversal to a longitudinal axis of the optical fiber, the scanning mechanism comprising a piezoelectric stage, the acylindrical focussing lens being mounted on said piezoelectric stage.

* * * * *